United States Patent
Hosomi et al.

(10) Patent No.: US 8,244,769 B2
(45) Date of Patent: Aug. 14, 2012

(54) SYSTEM AND METHOD FOR JUDGING PROPERTIES OF AN ONTOLOGY AND UPDATING SAME

(75) Inventors: Itaru Hosomi, Tokyo (JP); Hironori Mizuguchi, Tokyo (JP); Dai Kusui, Tokyo (JP)

(73) Assignee: NEC Corporation, Tokyo (JP)

( * ) Notice: Subject to any disclaimer, the term of this patent is extended or adjusted under 35 U.S.C. 154(b) by 341 days.

(21) Appl. No.: 12/598,304

(22) PCT Filed: May 27, 2008

(86) PCT No.: PCT/JP2008/059705
§ 371 (c)(1),
(2), (4) Date: Oct. 30, 2009

(87) PCT Pub. No.: WO2008/146807
PCT Pub. Date: Dec. 4, 2008

(65) Prior Publication Data
US 2010/0121885 A1 May 13, 2010

(30) Foreign Application Priority Data
May 31, 2007 (JP) ................... 2007-144866

(51) Int. Cl.
*G06F 7/00* (2006.01)
*G06F 17/30* (2006.01)
(52) U.S. Cl. ...................................... 707/794
(58) Field of Classification Search .............. None
See application file for complete search history.

(56) References Cited

U.S. PATENT DOCUMENTS

2006/0020493 A1* 1/2006 Cousineau et al. ............ 705/2
2007/0266384 A1* 11/2007 Labrou et al. ............. 718/100

FOREIGN PATENT DOCUMENTS

| JP | 2000-137720 A | 5/2000 |
|---|---|---|
| JP | 2000-207407 A | 7/2000 |
| JP | 2001-014166 A | 1/2001 |
| JP | 2002-099565 A | 4/2002 |
| JP | 2005-509952 A | 4/2005 |
| JP | 2005-148886 A | 6/2005 |
| JP | 2006-163941 A | 6/2006 |

(Continued)

OTHER PUBLICATIONS

Fumiaki Itoh et al.; "Example Based Frame Mapping Applied to Information Agents for Distributed Sources"; IEICE Journal, vol. J81-D-1, No. 5, pp. 433-442, 1998, no English.

(Continued)

*Primary Examiner* — Uyen T. Le
(74) *Attorney, Agent, or Firm* — Dickstein Shapiro LLP

(57) ABSTRACT

To provide a technique for structuralizing ontology in a prescribed form to a structure to which features of data are reflected. An ontology processing device has a structuralizing device for structuralizing properties of the ontology in the prescribed form generated from a set of instance data containing a combination of a subject, a property, and an object expressed with a character string according to the features of the object, and has a ontology storage device which stores the ontology structuralized by the structuralizing device. With this structure, the properties of the ontology in the prescribed form are corrected or expressed as an ontology structure by reflecting the characteristics of a set of the objects obtained from the data.

38 Claims, 32 Drawing Sheets

FOREIGN PATENT DOCUMENTS

WO  WO-03/042872 A1  5/2003

OTHER PUBLICATIONS

Uchida, et al.;"Fundamental Study on Automatic Building of Ontology"; The Japanese Society for Artificial Intelligence Material, SIG-SW&ONT-A301-05, 2003, no English.

Cyber Edge, Media Coverage on Nov. 21, 2006 regarding Sale of "Ontology Generator"; http://www.semanticweb.jb/pb/OntologyGenerator.html, no English.

"Hozo—Operation Manual for Ontology Editor" http://www.ei.sanken.osaka-u.ac.jp/hozo/manual/manual.html.

* cited by examiner

FIG.4

⟨namespace⟩http://www.sample.com/domains/business/address/⟨/namespace⟩
⟨meta⟩
⟨creator⟩http://www.sample.com/foo1.exe⟨/creator⟩
⟨timestamp⟩2007-1-23T17:10:03+09:00⟨/timestamp⟩
⟨rating⟩0.80⟨/rating⟩
⟨source⟩http://db.sample.com/customer/address.jsp⟨/source⟩
⟨/meta⟩
⟨body type="instance"class="CUSTOMER INFORMATION"⟩
⟨![CDATA[
subject, property, object
SUZUKI TARO、FULL NAME、SUZUKI TARO
SUZUKI TARO、OCCUPATION、SELF-EMPLOYED
SUZUKI TARO、HOME ADDRESS、KANAGAWA YOKOHAMA-SHI⋯
SUZUKI TARO、WORKPLACE ADDRESS、
SUZUKI TARO、MATERIAL SENDING DESTINATION、HOME
TANAKA JIRO、OCCUPATION、STUDENT
 ～～～～～～～
YOSHIDA YOKO、MATERIAL SENDING DESTINATION、HOME
]]⟩
⟨/body⟩

FIG.6

@prefix rdf:⟨http://www.w3.org/1999/02/22-rdf-syntax-ns#⟩.
@prefix rdfs:⟨http://www.w3.org/2000/01/rdf-schema#⟩.
@prefix owl:⟨http://www.w3.org/2002/07/owl#⟩.
@prefix meta:⟨http://www.sample.com/ontology/metadata#⟩.
@prefix pr1:⟨http://www.sample.com/domains/business/address/⟩.
pr1:i001 rdf.type pr1:CUSTOMER INFORMATION
pr1:i001 rdfs:label"SUZUKI TARO"
pr1:FULL NAME rdfs:subClassOf owl:Class.
pr1:has FULL NAME rdfs:domain pr1:CUSTOMER INFORMATION.
pr1:has FULL NAME rdfs:range pr1:FULL NAME.
{pr1:i001 pr1:has FULL NAME pr1:SUZUKI TARO}
meta:creator⟨http://www.sample.com/foo1.exe⟩;
meta:timestamp"2007-1-23T17:10:03+9:00";
meta:rating"0.80";
meta:source⟨http://db.sample.com/customer/address.jsp⟩.
pr1:OCCUPATION rdfs:subClassOf owl:Class.
pr1:has OCCUPATION rdfs:domain pr1:CUSTOMER INFORMATION.
pr1:has OCCUPATION rdfs:range pr1:OCCUPATION.
{pr1:i001 pr1:has OCCUPATION pr1:SELF-EMPLOYED}
meta:creator⟨http://www.sample.com/foo1.exe⟩;
meta:timestamp"2007-1-23T17:10:03+9:00";
meta:rating"0.80";
meta:source⟨http://db.sample.com/customer/address.jsp⟩.
pr1:HOME ADDRESS rdfs:subClassOf owl:Class.
pr1:has HOME ADDRESS rdfs:domain pr1:CUSTOMER INFORMATION.
pr1:has HOME ADDRESS rdfs:range pr1:HOME ADDRESS.
~~~~~~~
{pr1:i001 pr1:has MATERIAL SENDING DESTINATION pr1:HOME}
meta:creator⟨http://www.sample.com/foo1.exe⟩;
meta:timestamp"2007-1-23T17:10:03+9:00";
meta:rating"0.80";
meta:source⟨http://db.sample.com/customer/address.jsp⟩.

FIG.7

| FULL NAME | OCCUPATION | HOME ADDRESS | WORKPLACE ADDRESS | MATERIAL SENDING DESTINATION |
|---|---|---|---|---|
| SUZUKI TARO | SELF-EMPLOYED | KANAGAWA YOKOHAMA-SHI... | | HOME |
| TANAKA JIRO | STUDENT | KAGAWA MARUGAME-SHI... | | HOME |
| TAKAHASHI HANAKO | | | OSAKA KITA-KU... | HOME |
| KOBAYASHI SABURO | COMPANY EMPLOYEE | | TOKYO MINATO-KU... | WORKPLACE |
| YOSHIDA YOKO | | AICHI NAGOYA-SHI... | | HOME |

FIG.15

| FULL NAME | OCCUPATION | HOME ADDRESS | WORKPLACE ADDRESS | MATERIAL SENDING DESTINATION | E-MAIL ADDRESS |
|---|---|---|---|---|---|
| SUZUKI TARO | SELF-EMPLOYED | KANAGAWA… | | HOME | suzki@abc.com |
| TANAKA JIRO | STUDENT | KAGAWA… | | HOME | jiro@aaa.ne.jp |
| TAKAHASHI HANAKO | | | OSAKA… | HOME | hana@xxxxx.net |
| KOBAYASHI SABURO | COMPANY EMPLOYEE | | TOKYO… | WORKPLACE | koba3@yyyy.co.jp |
| YOSHIDA YOKO | | AICHI… | | HOME | |
| ARAKI MINORU | STUDENT | TOKYO… | | HOME | hoge@zzz.ne.jp |
| SAKAI ICHIRO | SELF-EMPLOYED | | KYOTO… | WORKPLACE | ichiro@ppp.com |
| OTA SHIRO | | NARA… | | HOME | o-siro@qqq.or.jp |

FIG.17

| FULL NAME | OCCUPATION | ADDRESS | MATERIAL DISTRIBUTING DESTINATION |
|---|---|---|---|
| SUZUKI TARO | SELF-EMPLOYED | KANAGAWA YOKOHAMA-SHI… | HOME |
| TANAKA JIRO | STUDENT | KAGAWA MARUGAME-SHI… | HOME |
| TAKAHASHI HANAKO | | OSAKA KITA-KU… | HOME |
| KOBAYASHI SABURO | COMPANY EMPLOYEE | TOKYO MINATO-KU… | WORKPLACE |
| YOSHIDA YOKO | | AICHI NAGOYA-SHI… | HOME |
| ARAKI MINORU | STUDENT | TOKYO SHIBUYA-KU… | HOME |
| SAKAI ICHIRO | SELF-EMPLOYED | KYOTO YAWATA-SHI… | WORKPLACE |
| OTA SHIRO | | NARA NARA-SHI… | HOME |

FIG.20

| FULL NAME | OCCUPATION | HOME ADDRESS | WORKPLACE ADDRESS | MATERIAL SENDING DESTINATION | ADDRESS | MATERIAL DISTRIBUTING DESTINATION |
|---|---|---|---|---|---|---|
| SUZUKI TARO | SELF-EMPLOYED | KANAGAWA… | | HOME | KANAGAWA… | HOME |
| TANAKA JIRO | STUDENT | KAGAWA… | | HOME | KAGAWA… | HOME |
| TAKAHASHI HANAKO | | | OSAKA… | HOME | OSAKA-SHI… | HOME |
| KOBAYASHI SABURO | COMPANY EMPLOYEE | | TOKYO… | WORKPLACE | TOKYO… | WORKPLACE |
| YOSHIDA YOKO | | AICHI… | | HOME | AICHI… | HOME |
| ARAKI MINORU | STUDENT | | | | TOKYO… | HOME |
| SAKAI ICHIRO | SELF-EMPLOYED | | | | KYOTO… | WORKPLACE |
| OTA SHIRO | | | | | NARA… | HOME |

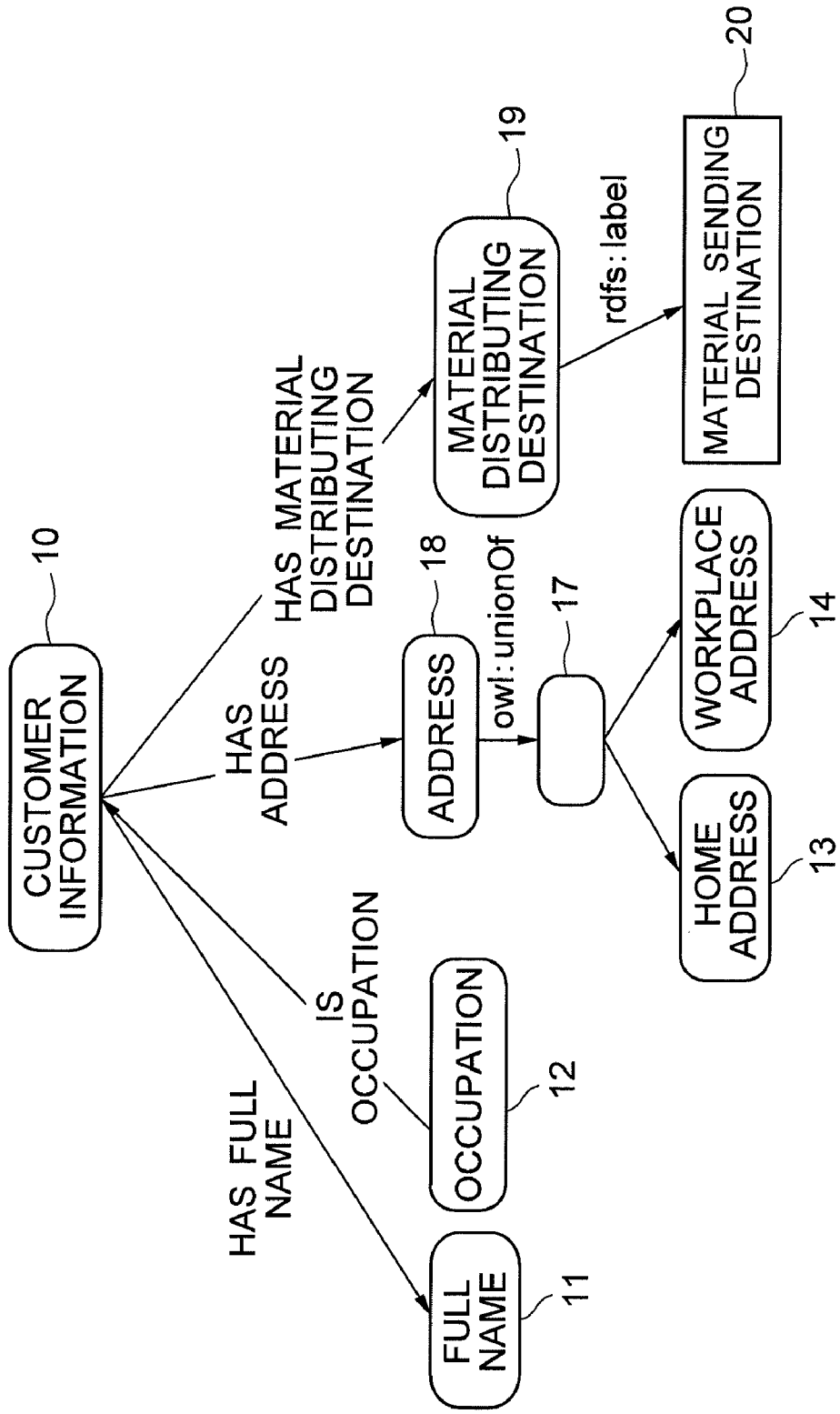

FIG.25

| OCCUPATION | COMPANY NAME |
|---|---|
| COMPANY EMPLOYEE | AA INC. |
| COMPANY EMPLOYEE | BB LIMITED PRIVATE COMPANY |
| STUDENT | |
| PUBLIC SERVANT | CC CITY HALL |
| | |

SYSTEM AND METHOD FOR JUDGING PROPERTIES OF AN ONTOLOGY AND UPDATING SAME

TECHNICAL FIELD

The present invention relates to an ontology processing device, an ontology processing method, and an ontology processing program.

BACKGROUND ART

The Internet and Intranet have come to establish the positions as the main media for dispatching information and exchanging opinions, and the amount, versatility, and promptness thereof have become the "must" for conducting investigations/analysis of various kinds of information. In the works such as collecting necessary information on the net and classifying each piece of information from a significant viewpoint, it is effective to make and use ontology. Ontology is a definition of properties of a given concept, or a definition of relationships between concepts or phenomena. Further, there is also a case where the ontology includes instances which satisfy the defined relationships.

Through expressing the ontology by using a certain formal descriptive method such as OWL (Web Ontology Language) recommended by World Wide Web Consortium (W3C), comparison and integration of a plurality of kinds of ontology can be done easily. In general, the ontology is made manually. However, there is a limit for manually investigating all the properties (functions and kinds of characteristics) of each of a great number of products, for example, and for manually updating kinds of properties and definitions of the products such as portable telephones every time whose properties are changed frequently.

In order to reduce the labor for building the ontology, first, a technique for making it easier to collect subject matters to be the elements of the ontology, properties thereof, and objects is important. As a technique for automatically collecting words and phrases showing the properties (property expressions) of a specific kind of targets, there is a technique disclosed in Patent Document 1. In Patent Document 1, having a set of a specific kind of documents prepared in advance as input, words and phrases frequently appear in the document set are extracted as property expressions. Further, in Patent Document 1, words and phrases of high co-occurrence characteristic existing in the vicinity of each of the extracted properties are extracted as objects which correspond to the respective properties.

Patent Document 2 discloses a method for extracting properties and objects using the ontology. This method prepares ontology showing a specific concept in advance, and extracts properties and objects which go along with conditions expressed by the ontology. With the above-described techniques, the properties of various targets and values of each of the properties can be automatically collected from the Internet and databases.

Further, Patent Document 3 discloses a method which gives important degrees to each property of the ontology, and extracts information regarding only the property whose important degree exceeds a prescribed threshold value. However, the judging reference for determining information regarding which property is to be extracted is only a single threshold value for the important degree, and there is no device disclosed for determining the object to be extracted based on the mutual dependent relationship between the objects.

Non-Patent Document 1 discloses a method which automatically determines the corresponding properties in different frames for a set of a plurality of kinds of targets, properties, and objects written as frames. However, there is no method provided to integrate each of the frames as ontology.

Regarding terms of a specific field, Non-Patent Document 2 discloses a method for automatically creating a thesaurus in which synonyms, narrow-sense words, broad-sense words, and related words are defined. However, this method is limited only to creating the thesaurus, and it is not capable of collecting the ontology for describing the concept and instances thereof and organizing those.

Non-Patent Document 3 provides a device for automatically converting a table written in CSV (Comma Separated Value) into ontology conforming to OWL described above, and it is a feature of that device to be able to easily generate correct ontology as syntaxes of OWL without having detailed knowledge of OWL. However, the device is not provided with a function capable of supplementing incomplete properties and vocabularies of the ontology and a function capable of detecting relationships between the properties and between objects and integrate those or supporting the integration thereof.

The conventional ontology creating methods such as those described in Non-Patent Document 2 and Non-Patent Document 3 are achieved as an ontology creating unit 20 which includes a data input device 1 for inputting data as the base for ontology, an ontology-making device 2 for converting the input data into a form of ontology, and an ontology storage device 3 for storing the ontology generated by the conversion, as shown in FIG. 31. However, with the use of only the constitution of such ontology creating unit 20, it is necessary to write in advance the characteristics and restrictions of each property that are supposed to be in the ontology and all the information regarding the structure of the ontology into the input data. Preparation of such data is a heavy burden on the users.

Alternatively, the ontology creating unit 20 can be made into a constitution as in FIG. 32 through further providing an ontology editing system that is disclosed in Non-Patent Document 4. This makes it possible to correct and integrate the already-generated ontology manually. However, when the number of generated ontology becomes large, it becomes difficult to perform editing works on a terminal screen manually.

Patent Document 1: Japanese Unexamined Patent Publication 2000-137720
Patent Document 2: Japanese Unexamined Patent Publication 2000-207407
Patent Document 1: Japanese Unexamined Patent Publication 2005-148886
Non-Patent Document 1: ITOH, UEDA, IKEDA, "Example Based Frame Mapping Applied Information Agents for Distributed Sources" IEICE Journal, Vol. J81-D-I, No. 5, pp. 433-442, 1998
Non-Patent Document 2: UCHIDA, ISHINO, "Fundamental Study on Automatic Building of Ontology", The Japanese Society for Artificial Intelligence Material, SIG-SW&ONT-A301-05, 2003
Non-Patent Document 3: Cyber Edge, Media Coverage on Nov. 21, 2006, regarding Sale of "Ontology Generator", http://www.semanticweb.jp/pub/OntologyGenerator.html
Non-Patent Document 4: "Hozo—Operation Manual for Ontology Editor", http://www.ei.sanken.osaka-u.ac.jp/hozo/manual/manual.html

DISCLOSURE OF THE INVENTION

Problems To Be Solved By the Invention

With such techniques described above, it is necessary to define in advance all the properties that may be required to write a certain concept or instances of the concept for creating ontology and building knowledge of the instances based on the ontology. Thus, it is not possible to collect more properties and objects from a set of imperfect properties and to build the ontology and instances including consistency therebetween. Further, it is not possible with such techniques to automatically distinguish essential properties for a certain concept, unessential properties for a certain concept, and properties which are in a complementary relationship, and to express those in the structure of the ontology.

An object of the present invention is to provide a technique for building a prescribed-form ontology into a structure upon which the features of the data are reflected.

Means For Solving the Problem

The ontology processing device according to the present invention is an ontology processing device for processing ontology, which includes a structuralizing device that corrects a structure of ontology in a prescribed form created from a set of instance data containing a combination of a subject, a property, and an object expressed with a character string according to statistical features of the objects contained in the set of the instance data.

The ontology processing method according to the present invention is a method for processing ontology, which includes: correcting a structure of ontology in a prescribed form created from a set of instance data containing a combination of a subject, a property, and an object expressed with a character string according to statistical features of the objects contained in the set of the instance data.

The ontology processing program according to the present invention is a program which enables a computer to execute a function of correcting a structure of ontology in a prescribed form created from a set of instance data containing a combination of a subject, a property, and an object expressed with a character string according to statistical features of the objects contained in the set of the instance data.

Effect of the Invention

The present invention makes it possible to correct the properties of the prescribed-form ontology by reflecting the characteristics of the set of the objects obtained from the data, or to express those as the structure of the ontology.

BEST MODES FOR CARRYING OUT THE INVENTION

First Exemplary Embodiment

A first exemplary embodiment of the invention will be described hereinafter by referring to the drawings.

FIG. 1 is a block diagram showing an ontology creating device according to the first exemplary embodiment of the invention. Referring to FIG. 1, the ontology creating device 10 according to the first exemplary embodiment of the invention includes a data input device 1, an ontology-making device 2, a structuralizing device 3, and an ontology storage device 4.

The data input device 1 provides a measure for inputting data required for creating ontology. The data required for creating the ontology includes a name of concept that is a target to be expressed as the ontology, properties of the concept, a range (value range) of values the properties may take (objects), names expressing individual instances contained in the concept, specific objects of each property, and the like. For example, when expressing a concept having a name of "customer information" as ontology, the properties include such properties having a value range of "full name", "occupation", "address", and the like, and values of each property in instances of the concept such as "SUZUKI Taro", "self-employed", "Kanagawa Yokohama~".

With OWL described above, "triple" configured with three elements such as a subject showing a single concept or an instance, a property thereof, and a value range of the property is written as a basic unit of the ontology. The value range of the property can also be a concept. For example, "full name" is one concept, and it can be used as a value range of a property "author" of a subject "book". In this case, the triple is "book, author, full name", and this is a minimum-unit ontology. The actual syntaxes of OWL are written according to an XML format or other formats. Further, it is also possible to write instances of a certain concept by using the triple. For example, for the ontology regarding the "book" described above, "Botchan, author, NATSUME Soseki" is an instance. There is also a case where an instance is considered as a part of the ontology.

The data input device 1 according to the first exemplary embodiment of the invention may include metadata showing created date and time of each triple, name of the creator, reliability, and the like in the input data when creating the ontology. There are cases where the reliability is determined by calculation processing when creating the corresponding triple by some kind of calculation and cases where the reliability is determined by a capacity expected for the creator.

The ontology-making device 2 converts the data input by the data input device 1 into the ontology of a prescribed form. Conversion of the input data having the above-described triple as the basic unit can be achieved by the structure shown in FIG. 2, for example.

FIG. 2 is a detailed example of the ontology-making device 2. A subject classifying device 201 classifies the subjects contained in the input data as necessary. Similarly, a property classifying device 202 classifies the properties contained in the input data as necessary. An object classifying device 203 classifies the objects contained in the input data as necessary. An ontology writing device 204 writes ontology of a single unit in a prescribed form such as OWL based on the classified subjects, properties, objects, and the like. A metadata adding device 205 adds various kinds of metadata to each of the triples (e.g., concept, property, object) written by the ontology writing device 204.

As a method for the metadata adding device 205 to give the metadata to the ontology, there is a method which adds metadata by using database that is used exclusively for the metadata separately from the ontology or a method which gives metadata by writing the metadata in a same format as that of a prescribed ontology format, and treating the metadata as a part of the ontology. With the former method, search for the ontology only with the metadata can be done at a high speed. With the latter method, search and reference can be made regardless whether it is the ontology or the metadata.

Through adding the metadata by using the metadata adding device 205 in the manner described above, it becomes possible to refer only to the ontology newer than a designated date and time by a triple unit and to utilize the ontology of a specific reliability or higher in accordance with the usages.

The structuralizing device 3 structuralizes the properties from the relationship regarding the properties contained in the ontology created by the ontology-making device 2 by combining those as necessary. Structuralization is to redefine a certain property of a series of properties of a single concept written by the ontology-making device 2 or to define a new property by combining a plurality of properties.

FIG. 3 is a detailed example of the structuralizing device 3.

A necessity judging device 301 judges necessity degree of each property contained in the ontology created by the ontology-making device 2 for a class that carries each property based on a set of corresponding objects, classifies the properties according to the necessity degree, and reflects the classified result upon the ontology.

In each instance configured with a set of objects for a series of properties of the ontology upon which the classified result is reflected by the necessity judging device 301, a complementary relationship judging device 302 judges a combination of properties as being in a complementary relationship when there is necessarily an object for another specific property if there is no object for a given property, and vise versa. Further, regarding the combination of the properties judged as being in a complementary relationship, the complementary relationship judging device 302 reflects upon the ontology that those properties are in a complementary relationship with respect to each other.

With the first exemplary embodiment structured in the manner described above, it is possible to automatically create the ontology according to a prescribed form from the input data. Further, it is possible to correct the properties of the created ontology or to expresses as the structure of the ontology by reflecting the characteristics of the set of the objects that can be obtained from the input data.

The reasons are as follows. That is, the ontology-making device 2 performs respective classifications correspondingly on the subjects, properties, and objects within the input data to build the ontology. Further, it is because the structuralizing device 3 judges the necessity and the complementary relationship regarding each property within the ontology created by the ontology-making device 2 from the set of the objects, and determines the kinds of the properties and hierarchical structures thereof based on the respective judgment results.

Furthermore, the exemplary embodiment makes it possible to perform classifications and filtering of the ontology using metadata by adding the metadata showing the ontology created date and time, creator, reliability, and the like to the created ontology.

Next, a still more detailed example of the aforementioned first exemplary embodiment will be described. In explanations of the structures and operations below, the same structures and operations as those described above are omitted as appropriate.

FIG. 4 is an example of data input by the data input device 1 according to the first exemplary embodiment. Referring to FIG. 4, as the data input by the data input device 1 to create the ontology, a creator element showing the creator of the input data, a timestamp element showing the date and time at which the input data is created, a rating element showing the reliability of the created input data, a source element showing the information source that is used for creating the input data are written in XML format, respectively, in addition to a namespace element showing the namespace of each element name of the ontology and a body element showing the input data main body. The input data main body is further classified at least into three kinds such as the subject, property, and object, and at least one triple is written in CSV format by having a combination configured with one piece each of those three kinds of data as a single triple. In addition, the body element also includes a type property which discriminates whether the subject of each triple shows a specific concept or shows an instance of a specific concept, and a class property which designates the name for identifying the specific concept.

The data as the target of the data input device 1 is not limited to be in the XML format as in FIG. 4, and the input data main body is not limited to the CSV format, either. Further, presence of metadata and the kinds thereof, the unit for adding the metadata are not limited to the examples shown in FIG. 4. For example, instead of writing one-piece metadata in common to all the triples contained in the input data for each kind as in FIG. 4, it is also possible to write the metadata such as the rating element corresponding to the individual triple in each row within the body element. It is also possible to write only the metadata whose values are common to all the triples in advance, and write the metadata whose values are different in each triple in forms corresponding to the respective triples. Further, the input data may not have to be text data but may be binary data such as a DOM object of XML, and the input data main body itself does not necessarily have to be limited to the triple "subject, property, object". However, in the following explanation, it is assumed that the ontology takes the triple as a unit and various kinds of elements and element properties written in the examples of FIG. 4 are contained in the input data.

FIG. 5 is a flowchart which describes the processing procedure of the ontology-making device 2 according to the first exemplary embodiment shown in FIG. 2 in more details.

The subject classifying device 201 receives the input data input by the data input device 1, judges whether or not the subject contained in the input data is "class" which shows the concept, and considers that the subject is an instance of a certain concept when it is not "class". The subject classifying device 201 judges whether or not the subject is the class by referring to the value of the type object of the body element in the input data shown in FIG. 4, for example. The class and the instance are both written as a kind of "resource". The resource is a thing that can be identified uniquely. For example, with OWL that is an ontology descriptive language, one resource is expressed by one URI (Uniform Resource Identifier), for example. That is, for creating the ontology expressed in an OWL format, the subject has to be a resource that has an URI. The ontology outputted by the ontology-making device 2 according to the exemplary embodiment of the invention is not limited to the ontology of the OWL format. However, in the detailed processing procedure shown in FIG. 5, it is presupposed that the subject as well as the property is a kind of resource, respectively, as in the case of OWL and that the object is a kind of resource or literal.

When the subject contained in the input data received from the data input device 1 is the class and it has a class property which designates which of the classes the input data is written about as in the case of FIG. 4, the subject classifying device 201 directly takes that class as the subject of the ontology to be outputted if the class of the subject is the same as the class designated by the class property. When the class shown by the subject is different from the designated class, the subject classifying device 201 judges that the class shown by the subject is a different class that shows the same concept as that of the designated class or judges as a different name, writes the relationship with respect to the designated class in a prescribed ontology descriptive format, and takes the designated class as the subject of the ontology to be outputted.

When the subject is not the class, the subject classifying device 201 then judges whether or not the subject is an already-known resource. When one of the resources that are recorded in advance to the ontology creating device 10 corresponds to the subject, the subject classifying device 201 takes the already-known resource as the subject of the ontology to be outputted. When the subject of the input data is not the already-known resource, the subject classifying device 201 records as a new resource the data written as the subject in the input data, and takes that resource as the subject of the ontology to be outputted.

Upon completing the processing by the subject classifying device 201, the procedure moves on to the processing of the property classifying device 202. The property classifying device 202 judges whether or not the property in the input data is a resource which shows an already-known property as in the case of the subject. If it is the already-known property, the property classifying device 202 directly takes it as the property of the ontology to be outputted. When it is not the already-known property, the property classifying device 202 records as a resource showing a new property the data written as the property in the input data, and takes that resource as the property of the ontology to be outputted.

Upon completing the processing by the property classifying device 202, the procedure moves on to the processing of the object classifying device 203. The object classifying device 203 first refers to the value range of the properties settled by the property classifying device 202 described above, and checks whether or not the value range is literal.

Each property showing the relationship between the subject and the object in the ontology has a definition range and a value range. The definition range is a class the subject itself shows or it is a higher-order class to which the subject belongs, and the value range is a class which defines a characteristic and a set of the values the object can take. For example, the value range of "sex" property having "human" class as the definition range can be expressed as a set of classes configured with two kinds of classes "male" and "female". When a new property is defined by the property classifying device 202 and the value range of that property is unknown, the property can be defined by generating a new class having an appropriate URI and taking the class as the value range.

"Literal" is a class showing data itself written in a character string or a numerical value but not in a form in which the written data shows a specific concept or an instance. Dates, telephone numbers, abbreviations of certain things, and the like correspond to literals. In a case of OWL, the fact that the value range of the property is literal can be expressed by using "literal" class (rdfs: Literal).

When the value range of the property classified by the property classifying device 202 is literal, the object classifying device 203 takes the data itself written as the object in the input data as the object of the ontology to be outputted. When the value range of the property is not literal, the object classifying device 203 judges whether or not the object written in the input data shows a resource. If it is the resource, the object classifying device 203 takes it directly as the object of the ontology to be outputted. When the value range of the property is not literal and the object written in the input data is not the resource, the object classifying device 203 defines the data written as the object in the input data as a new resource, and takes the defined resource as the property value of the ontology to be outputted.

For example, it is assumed that one row out of the input data converted into the triple of "subject, property, object" in the input data in the format of FIG. 4 is YOSHIDA Yoko rdfs: label TAKAHASHI Yoko". Note that "rdfs: label" is a property for defining another name for the subject in OWL, and it can be used when writing one's maiden name, nickname, or the like to the ontology in a case where the subject is a person. Since the value range of "rdfs: label" is literal, the ontology-making device 2 writes "rdfs: label" and the character string "TAKAHASHI Yoko" directly as the property and the object of the ontology, respectively, provided that "rdfs: label" is already known. The ontology-making device 2 writes "YOSHIDA Yoko" in the triple as the resource.

The ontology writing device 204 writes a combination of the subject, property, object settled in each processing conducted by the devices from the subject classifying device 201 to the object classifying device 203 as one-unit ontology in a prescribed form such as OWL.

Further, it is also possible with the use of the metadata giving device 205 to give metadata designated in the input data to the one-unit ontology written in a prescribed form.

FIG. 6 is an example of the ontology outputted as a result of the above-described processing executed by the ontology-making device 2. The ontology shown in FIG. 6 is written in OWL format by using a syntax rule called "Notation 3" that is proposed by W3C. "@prefix" in FIG. 6 defines various kinds of name spaces. Other than the name spaces designated explicitly in the input data, name spaces for designating each term of RDF, RDF Schema, and OWL used in the OWL-format ontology and name spaces showing terms for discriminating the metadata, the subject, property, object are written, respectively.

The data following the definitions of the name spaces is the generated ontology main body. "pr1: i001 rdf: type pr1: customer information" on the first row of the ontology main body shows that the subject "pr1: i001" is a resource belonging to the "pr1: customer information" class in Notation 3 syntax rule. "pr1: 001" is the resource automatically defined by the ontology-making device 2, which shows one instance that is configured with a combination of "subject, property, object" ("pr1: 001, rdfs: label, SUZUKI Taro" "pr1: 001, pr1: full name, pr1: SUZUKI Taro" "pr1: pr1: occupation, pr1: self-employed" "pr1: 001, pr1: material sending destiny, pr1: home") having the resource depicted in FIG. 6 as the subject. Further, metadata (a combination of "subject, property, object" having the entire triple as the subject and "meta: creator" and the like as the property) designated respectively in the input data is given to each triple in parenthesis in FIG. 6.

The same metadata is written individually to each triple in parenthesis in the ontology description example of FIG. 6. However, it is also possible with the ontology storage device 4 to store the metadata to another database from that of the triples of the ontology main body and to give respective reference IDs to each triple and the corresponding data so that both can be referred mutually. When reference can be made by a triple unit or a series of metadata unit with the reference IDs, it is possible to suppress the storage capacity required for storing the metadata by relating the same-content data with a plurality of triples.

For example, it is assumed that the data as shown in FIG. 7 is obtained by the data input device 1 as "customer information". In FIG. 7, only the properties ("name", "occupation", and the like) and the objects ("SUZUKI Taro", "self-employed", and the like) are written in a corresponding table. However, the actual writing format may be in a form as in FIG. 4 or any other forms. From the data as in FIG. 7, the ontology as in FIG. 8 having the "customer information" class as the subject can be generated by the ontology-making device 2.

FIG. 8 is a graph of the ontology that is shown in FIG. 6. In FIG. 8, relationships between different classes are expressed with two nodes showing the classes and arrows connecting those, and each arrow shows one kind of property. The node at the root of the arrow showing a given property shows the definition range of that property, the node at the tip of the arrow shows the value range of that property, and the character string ("has name", for example) accompanying the arrow shows the property name. Regarding the relationships between each of the classes expressed in this manner, the same class is shown with a single node within the graph (only "customer information" corresponds to this in FIG. 8).

Further, referring to the table of FIG. 7, it can be found that there are only "home" and "workplace" as the objects of "material sending destiny" property. As in this case, if the kinds of the objects for a given property are within a regulated number, the value range of that property may be defined as a union of a specific property. In the case of "material sending destiny" described above, the value range can be expressed as a set of classes configured with two elements {"home", "workplace"}. In the case of OWL, it can be expressed as follows (prefix "pr1" shows a name space that is given for convenience sake) by using the property which shows a union, "owl: unionOf", in the description of the value range (rdfs: range). However, when writing it in that manner, it is necessary to define both "home" and "workplace" as classes in advance.

```
<owl: ObjectProperty rdf: about="&pr1; material sending destiny">
<rdfs: domain rdf: resource="&pr1; customer information"/>
<rdfs: range>
<owl: Class>
<owl: unionOf rdf: parseType="Collection">
<owl: Class rdf: about="&pr1; home"/>
<owl: Class rdf: about="&pr1; workplace"/>
</owl: unionOf>
</owl: Class>
</rdfs: range>
</owl: ObjectProperty>
```

When the necessity degree judging device 301 of the structuralizing device 3 refers to the ontology as shown in FIG. 8 obtained by the ontology-making device 2, it evaluates the fulfilling rate of the object for each property. While there are objects in all the instances (correspond to each record in the table of FIG. 7) regarding "has name" property and "has material sending destiny" property, there are instances that have no object for each of the properties "has occupation", "has home address", and "has workplace address". The necessity judging device 301 defines the fulfilling rate of the object as a proportion of the instances among all the instances of a given property, in which the object thereof is filled, and sets a threshold value of the fulfilling rate as 80%. Referring to FIG. 7, the fulfilling rate of the object of "occupation" 12 is 60%. It is 60% for "home address" 13, and 40% for "workplace address" 14, which are both below the threshold value, 80%. In the same evaluation, the objects of both "full name" 11 and "material sending destiny" 15 are 100%, which exceed the thresholds value, 80%. As a result, the necessity degree judging device 301 judges that the necessity degrees of "has name" property and "has material sending destiny" property in the class of "customer information" 10 are high, and the necessity degree of each of the properties "has occupation", "has home address", and "has workplace address" is low.

The necessity degree judging device 301 reflects the judgment result of the necessity degrees based on the evaluation of the fulfilling rate as described above upon the ontology. The necessity degree judging device 301 keeps the property of the ontology judged as having high necessity in a state as it is generated by the ontology-making device 2. Regarding the property judged as having low necessity, the necessity degree judging device 301 rearranges the class that is in that value range to be in the definition range, and the class in the definition range into the value range. Further, the property name is changed as necessary. As a method for the necessity degree judging device 301 to change the name, "has occupation" in FIG. 8 is changed to "is occupation", for example. While "has occupation" property shows that "customer information" class has "occupation" resource as the object, "is occupation" shows that "occupation" resource is one of the objects of "customer information" class. This can be comprehended that the former means that "customer information" class always requires "occupation" class, whereas the latter means that "customer information" class does not necessarily require "occupation" class.

FIG. 9 shows an example of the result to which the necessity degree judging device 301 reflected the necessity degrees of the properties on the ontology in the manner described above.

The property necessity degree judging method and the reflecting method thereof to the ontology performed by the necessity judging device 301 described herein are merely illustrated as a way of example. It is possible to judge the necessity degree of the property by an evaluation method that is different from the method using the fulfilling rate as described above, and the judgment result may not include the two kinds, i.e., high necessity and low necessity. For example, the property whose fulfilling rate is 10% may be judged as unnecessary, and may be deleted from the ontology.

Following the processing of the necessity degree judging device 301, the complementary relationship judging device 302 refers to the ontology and searches the combination of properties which are in the above-described complementary relationship in each instance unit. When a given property A1 has no object in an instance I1, for example, if an property A2 that has an object is found in the same instance I1, the complementary relationship judging device 302 checks whether or not the property A1 has an object in an instance I2 in which the property A2 has no object. When the complementary relationship judging device 302 verifies that the property A1 and the property A2 in all the instances are in a relationship in which a lack of one of the objects is complemented by the other, the complementary relationship judging device 302 judges that those properties are in a complementary relationship. For example, in the data shown in FIG. 7, it can be seen that the respective objects of "home address" property and "workplace address" property are in a complementary relationship.

The complementary relationship judging device 302 reflects the judgment result of the complementary relationship upon the ontology through expressing the union of the property values of all the properties that are in the complementary relationship by using the classes and the properties. When writing the ontology in a graph as shown in FIG. 9 with OWL, for example, if the complementary relationship judging device 302 judges that the objects "home address" 13 and "workplace address" 14 in FIG. 9 are in a complementary relationship, the complementary relationship judging device 302 defines a provisional class which expresses a union of the two classes. The complementary relationship judging device 302 may or may not give a class name 16 to the provisional class, may give a property name "has Part" showing that it has some kinds of elements, for example, to the property which relates the provisional class 16 to "customer information" class, or may give more specific property name such as "has Some address" by taking a common part from "home address" 13 and "workplace address" 14. Then, the complementary relationship judging device 302 deletes both "is home address" and "is workplace address" properties which relate "customer information" class to each of the classes "home address" 13 and "workplace address" 14, and relates the provisional class 16 to each of the classes "home address" 13 and "workplace address" 14 with "owl: unionOf" property and "rdf: List" class 17 showing a list of elements. As a result, the ontology as shown in FIG. 10 can be obtained by the complementary relationship judging device 302.

As described above, the ontology can be structuralized by the necessity degree judging device 301 and the complementary relationship judging device 302 of the ontology structuralizing device 3. For example, the ontology shown in FIG. 8 generated based on the data as in FIG. 7 can be structuralized to the ontology that is shown in FIG. 10. The ontology in FIG. 10 shows that the concept expressed by "customer information" class essentially contains "full name" and "material sending destiny", and essentially contains either "home address" or "workplace address", and shows that "occupation" is not essential but can be an element.

When the knowledge above can be expressed by one piece of ontology, it is possible to judge whether or not a given document or database contains customer information with high accuracy, for example. Inversely, when it is judged whether or not a document or database contains customer information by using the ontology shown in FIG. 8, there is a possibility of making misjudgment that the document or the database does not contain customer information if it does not contain information regarding occupation even though it contains full name, material sending destiny, and either home address or workplace address or if it contains only either home address or workplace address.

Further, regarding the processing result obtained by the necessity degree judging device 301 and the complementary relationship judging device 302, in addition to expressing it by adding or changing the property in the manner described above, it is also possible to give a property "necessity degree" for the entire triple of the class, the property, and the object as shown in FIG. 11 and to express the necessity degree with the value of the property. In FIG. 11, "necessity degree" property is given to each triple such as "customer information, has full name, full name", and "essential", "nonessential", or "selective" is given as the object thereof. Such expression can be achieved by a descriptive method called "Reification" when writing it with OWL. The triples whose "necessity degree" properties are "selective" mean that the properties within each of the triples are in the above-described complementary relationship with respect to each other.

The ontology storage device 4 stores, in a reusable form, the ontology to which each piece of the above-described processing is applied. For example, through storing the ontology to a relational database or an XML database, for example, search and partial extraction of the ontology can be made possible.

FIG. 12 is a block diagram showing a hardware structure of the ontology creating device according to the first exemplary embodiment.

Referring to FIG. 12, the ontology creating device 10 according to the exemplary embodiment can be achieved with a same hardware structure as that of a typical computer device, and it is provided with: a CPU (Central Processing Unit) 101; a main storage section 102 used for a work area of data and a temporary retraction area of data, which is a main memory such as a RAM (Random Access Memory); a data output section 103 configured with a liquid crystal display, a printer, a speaker, and the like; a data input section 104 configured with a keyboard, a mouse, a scanner, and the like; a communication section 105 which transmits and receives the data by being connected to peripheral apparatuses; an auxiliary storage section 106 such as ROM (Read Only Memory) and a hard disk device; a system bus 107 which mutually connects each of the above-described structural elements; and the like.

The operations of the ontology creating device 10 according to the exemplary embodiment of the invention can be achieved by means of hardware through having a circuit component, which is configured with a hardware component such as an LSI (Large Scale Integration) to which a program for achieving such functions is installed, mounted inside the ontology creating device 10. Not only that, it can also be achieved by means of software through executing a program which provides each function of each of the above-described structural elements with the CPU 101 of the computer.

That is, the CPU 101 loads the program stored in the auxiliary storage section 106 to the main storage section 102 and executes it to control the operations of the ontology creating device 10, thereby making it possible to achieve each of the functions described above by means of software.

With a series of ontology creating method regarding the operations of the ontology creating device 10 described above, the ontology according to a standard ontology descriptive language OWL settled by W3C or an ontology descriptive format similar to that can be created automatically by having the data of a table structure having "subject, property, object" as one record as an input. Further, regarding each of the properties of the ontology created from the set of the parts corresponding to the objects of the input data, it is possible with this method to judge whether or not the property is an essential property or a nonessential property and to judge whether or not it is the property whose objects are in a complementary relationship, and to express the results of those judgments by changing the directivity of the properties and the property names, and by putting those in a hierarchical structure of a plurality of properties.

Second Exemplary Embodiment

A second exemplary embodiment will be described.

FIG. 13 is a block diagram showing the second exemplary embodiment of the ontology creating device according to the present invention. In FIG. 13, the data input device 1, the ontology-making device 2, the structuralizing device 3, and the ontology storage device 4 are the same as the devices of the same names of the first exemplary embodiment, respectively, so that explanations thereof are omitted.

Referring to FIG. 13, in the second exemplary embodiment, a property integration device 6 and an instance acquiring device 7 are provided further in addition to the structure of the first exemplary embodiment.

Among the properties having the same class (properties having the same class as a definition range) in the ontology received from the structuralizing device 3, if the objects (a set of he objects) of those properties can be considered the same, the property integration device 6 integrates those properties with each other. The property integration device 6 selects the property name after the integration on the following basis, for example. That is, the property integration device 6 employs the property name that has a greater number of objects among the properties before being integrated, employs the property name with a greater number of morphemes by performing a morpheme analysis on each of the property names before the integration, or employs the property name with which a greater number of search results can be obtained through conducting Web search by using each of the property names before the integration as the input keyword.

The instance acquiring device 7 further collects the data to be the instance of the ontology by using the ontology in which the properties are integrated by the property integration device 6. As the procedure for acquiring the instance, the instance acquiring device 7 first selects the class of the instance desired to be obtained from the ontology, for example, and collets the property which has that class as the definition range or the value range from the ontology.

Then, the instance acquiring device 7 searches pages on the web, files on a file system, or tables on a database which contains, as a character string, the names of all the properties (property names) which have the selected class as the definition range among the collected properties. However, when the property name is structured according to a specific regulation such as "has"+object name, e.g., "has full name", the instance acquiring device 7 may employ a heuristic method such as a method which uses only the object name in the latter part as a search keyword.

Further, when the property name is expressed with a union of a plurality of properties such as "owl: unionOf" of FIG. 10, the instance acquiring device 7 may integrate (at this time, duplicated pages, files, and tables may be deleted) the results obtained by individually conducting searches by using "home address" and "workplace address" as the objects of each property as the keywords, respectively.

Further, the instance acquiring device 7 may not only conduct searches by using the property name and object name as the keyword, but may also conduct searches by using modifications thereof (e.g., conduct AND searches by dividing "home address" into two keywords of "home" and "address"), searches according to a partial match of a character string, searches conducted by expanding "full name" to a synonym such as "name" and by using each of those as a keyword, for example, so as to collect instances in a more comprehensive manner.

When the Web pages, the files, the tables on the database are collected by the searches described above, the instance acquiring device 7 extracts the properties and the objects of each property contained in those data, and puts those into a set of instances in a same format as that of the data input by the data input device 1. When extracting the properties, the instance acquiring device 7 may extract not only the properties of the class used for the search but may also extract all the properties contained in the collected data. Further, as an extracting method of the objects, the instance acquiring device 7 can extract the data within the field corresponding to each property by using SQL or the like as it is, in a case where the target is the table of the database. In a case where the target is the Web page or the file, if it is found by conducting an analysis of HTML tag, for example, that there is a table or description corresponding to the table which includes the property name as a filed name that is used as the search keyword, the instance acquiring device 7 can extract the objects from each field which corresponds to the property name contained in the table and the like.

Further, the instance acquiring device 7 may secure the accuracy of the newly acquired instance by a method which judges the entire set of the newly collected objects as effective, if it is found that a prescribed number or more common objects are contained by comparing the set of objects obtained in the manner described above with the objects contained in the data input at the time of creating the ontology for each of the properties.

Furthermore, at the time of extracting the objects from the data collected by the search, in a case where the value range is the selected class and the property name is "is"+object name, which is the case other than the case where the property of the selected class is the definition range, the instance acquiring device 7 may extract, regarding the objects of such properties, the set of data of the fields whose object names as the definition range of the property match the field as the set of the objects.

The set of instances obtained by the instance acquiring device 7 in the manner described above is put into ontology again by using the ontology-making device 2. The ontology-making device 2 collects the data that fits to the ontology created in the past and puts it into ontology again so as to add new property that is not on the already-created ontology and correct each property or correct the structure configured with a plurality of properties.

FIG. 14 is a block diagram showing a structure when the higher-and-lower relationship judging device 303 is added further to the structuralizing device 3 that is shown in FIG. 3. When a set of objects corresponding to two or more given specific properties is included in a set of objects corresponding to a specific property other than the aforementioned properties and when the inclusive relationship individually applies in all the instances, the higher-and-lower relationship judging device 303 judges that the former two or more properties are the lower-order property of the latter property, and reflects that judgment result upon the ontology.

If there is detected an inclusive relationship of the objects regarding one property and the other two or more properties between the ontology created in the past and the newly created ontology when the instance acquiring device 7 creates the new ontology which shows the same concept by using the ontology that was created in the past, the higher-and-lower relationship judging device 303 expresses the aforementioned inclusive relationship in the ontology with a hierarchical structure while taking the latter two or more properties as the lower-order properties of the former one.

In the second exemplary embodiment, the ontology creating device is further provided with the property integration device 6 and the instance acquiring device 7 and, in addition, the structuralizing device 3 is further provided with the higher-and-lower relationship judging device 303. This makes it possible to create the ontology from the data of external service and system and to continuously update the ontology, so that the latest knowledge to which the changes of the data regarding those service and system are reflected can be provided to other service and system as the ontology. Further, through creating a plurality of pieces of ontology of different structures for the same class and integrating those, it is possible to expand the definition of the concept expressed by the class and the properties.

Next, a more detailed specific form of the above-described second exemplary embodiment will be described. In explanations of the structures and operations presented below, the same structures and operations as those described above are omitted as appropriate.

For example, there is considered a case where the ontology as shown in FIG. 10 obtained from the data show in FIG. 7 is already stored by the ontology storage device 4, and the data as shown in FIG. 15 is obtained by the instance acquiring device 7 by using that ontology. When the ontology making-device 2 creates the ontology in the same manner as has been described above by having the data as shown in FIG. 15 as the input data, the ontology as shown in FIG. 16 can be obtained. In the ontology shown in FIG. 16, a new property "has E-mail address" and a class showing an object "E-mail address" are added to the original ontology shown in FIG. 10.

It can be speculated that the above case can happen when ontology is created by collecting data from a given information source, and data is again collected from the same information source by using the same ontology after a certain time has passed. That is, changes in the data structure generated due to changes in the system or the service in the information source are also reflected upon the ontology.

As another method for acquiring the instances by the instance acquiring device 7, it is also possible to use a combination of each property name judging rules instead of using the property name and object name as a search keyword of the instance as in the above-described procedure. When the instance acquiring device 7 first collects a new instance regarding "customer information" class shown in FIG. 10, for example, the instance acquiring device 7 defines the class ("full name", union of "home address" and "workplace address", "material sending destiny") which shows the value range of the properties which have the same class as the definition range with a judging rule satisfied by respective sets of objects by using a heuristic method or manually. Since all the instances of "full name" property are pairs of one's family name and first name, the instance acquiring device 7 acquires new instances by expressing the judging rule of the object as "family name+first name" and by using a biographical dictionary. Similarly, the instance acquiring device 7 makes a rule that all elements of the union of "home address" and "workplace address" is a character string starting with a sequence of prefecture name and city, town, or village name, and conducts searches with a geographical dictionary. The value of "material sending destiny" property can be ruled as "home or workplace", since it is only required to detect either "home" or "workplace".

The combination of definitions of objects obtained as the result of ruling each of those in the manner described above can be expressed as {"family name+first name", "prefecture name+city, town, or village name", "home or workplace"}. Collection of new instances by the instance acquiring device 7 by using the combination of object definitions can be achieved through conducting classification of word unit such as family name, first name, and place name by conducting morpheme analysis using a morpheme analysis program such as ChaSen (http://chasen.naist.jp/hiki/ChaSen/) on character string data in an information source of the collection target, and by searching the classified words. For example, assuming that a series of character string such as "SAKAI Ichiro, self-employed, Kyoto Yawata-shi, - - - , workplace" is contained in the data of a given information source, a result such as "noun-one's name-family name (SAKAI) noun-one's name-first name (Ichiro) noun (self-employed) place name-prefecture name (Kyoto) place name-City name (Yawata-shi) - - - noun (workplace)" can be obtained by parsing the character string into morphemes in order from the head and classifying those. When the result is collating with the combination of the above-described objects, "SAKAI Ichiro" corresponds to "family name+first name", "Kyoto Yawata-shi" corresponds to "prefecture name+City, town, village name", and "workplace" corresponds to "home or workplace". Therefore, it can be detected as an instance of "customer information" class. Further, "self-employed" corresponds to one of the values of "occupation" class that takes "customer information" class as one of higher-order classes, so that this can be detected as well. However, "occupation" class is not an essential property of "customer information" class. Thus, the data can be determined as an instance of "customer information" class even if the data does not contain "self-employed".

Now, there is considered a case where the instances regarding "customer information" class are collected by the instance acquiring device 7 by using the method described above, and data shown in FIG. 17 is obtained anew. The data shown in FIG. 17 has three more instances compared to the data shown in FIG. 7. Inversely, the data extracted by being corresponded to "prefecture name+city, town, village name" has no discrimination regarding "home address" and "workplace address", and it is expressed simply as "address". When the instance detected by the instance acquiring device 7 is a part of a table, the property name such as "address" can be obtained by directly extracting each field name as it is from the table. Similarly, the property name of the data extracted by being corresponded to "home or workplace" is "material distributing destiny" in the table of FIG. 17, which is different from "material sending destiny" in the original ontology.

When the data as shown in FIG. 17 is obtained, the data is put into ontology again by the ontology-making device 2 with the structures of the ontology creating device shown in FIG. 13. As a result, the ontology as in a graph shown in FIG. 18 can be obtained. The ontology shown in FIG. 18 regards to "customer information" class that is the same as that of the already-created ontology in FIG. 10, and both pieces of ontology together can be expressed as a single piece of ontology that is shown in FIG. 19.

A list of the instances obtained by the combination of the properties and objects of the ontology expressed as in FIG. 19 can be put into a table as shown in FIG. 20. The table of FIG. 20 is obtained by integrating the records of first five people in each of the tables shown in FIG. 7 and FIG. 17 by judging that those records are the information regarding the same people. Such integration of the records can be achieved by employing such a heuristic judging standard that the object of "full name" property and objects of one or more of other property are common or by employing a duplicated record detecting method disclosed in Japanese Unexamined Patent Publication 2006-163941, for example.

In the table of FIG. 20, all the values filled in the sections of "material sending destiny" property are the same as the objects of "material distributing destiny". As in this case, when the values of the records are the same by a prescribed number or a prescribed proportion or more and at least the object set of one of the properties includes the object set of the other property, it is highly possible that both properties are the same or the one that has a greater number of objects is the higher-order property. Therefore, both properties can be integrated.

The integration can be achieved by a following method. That is, when the number of objects of one of the properties is greater than the number of objects of the other property by an amount more than a prescribed proportion, for example, the former property may be defined as the higher-order property and the latter property as the lower-order property. When the difference between the numbers of the objects does not exceed the prescribed proportion, the property name of the former property and the class name showing the value range may be kept as they are, and the property name of the latter property and the class name showing the value range may be defined as another property name corresponding to that of the former property and another name of the class name showing the value range thereof within the ontology.

Similarly, in the table of FIG. 20, it can be seen that the respective objects of "home address" and "workplace address" which are in a mutually complementary relationship are all equivalent to the objects of the same records in "address" based on the ontology as in FIG. 18. In addition, "address" has a greater number of objects, so that it can be assumed that "address" is the same property or the higher-order property of the property that is defined as a union of "home address" and "workplace address". Thus, both properties may be integrated.

For integrating the properties, whether or not to integrate the properties may be judged by calculating the editing distance between both character strings to evaluate whether or not it is within a prescribed value through comparing the property names or by evaluating whether or not the property names match with each other by utilizing a synonym dictionary, a thesaurus, or the existing ontology corresponding to those.

FIG. 21 shows an example of a result obtained by judging properties that are highly in common from the property set and object set of each property shown in FIG. 20 and integrating the properties that are highly in common from the ontology shown in FIG. 18.

In FIG. 21, "has material distributing destination" property and "has material sending destination" property as well as the classes showing the respective value ranges are integrated, and the name used for "material sending destination" class is defined as another name (can be expressed with rdfs: label property with OWL) of class such as "material distributing destination". Further although not shown in FIG. 21, another name "has material sending destination" can also be defined for "has material distributing destination".

Further, in FIG. 21, the value range of "has address" property is expressed with "address" class, and this "address" class is defined as a union of "home address" class and "workplace address" class by using "owl: unionOf" property. This is a result of integration conducted in the same manner as the integration of "has material distributing destination" property and "has material sending destination" property, since "address" class that is the value range of "has address" property includes a union of each of the instances of "home address" class and "workplace address" class which correspond to the value range of "has Some address" property.

Integration of "has address" property and "has Some address" property described above may be achieved by providing the higher-and-lower relationship judging device 303 anew. When the different numbers of objects of "has address" property are larger than different numbers of objects of "has Some address" property by a prescribed number or more, "has address" property and "has Some address" property may not be integrated to a single property but can be expressed as a hierarchical relationship of the properties by employing the higher-and-lower relationship judging device 303. That is, it is possible to redefine "address" class showing the value range of "has address" property as a class of the subject of "has Some address" property and express the ontology as in a graph shown in FIG. 22. This makes it possible to express on the ontology that there is a possibility of having "other types of address" 21 shown with a dotted line in FIG. 22 in addition to "home address" and "workplace address" in the value range of "has address" property.

The ontology creating device according to the second exemplary embodiment can be achieved by a same hardware structure as that of the ontology creating device according to the first exemplary embodiment shown in FIG. 12.

With a series of ontology creating method according to the operations of the ontology creating device 10 of the exemplary embodiment described above, it becomes possible to conduct search of the ontology or reference thereto with any of the property names before being integrated, through integrating two or more redundant properties along with the respective objects of the ontology configured with the set of properties and objects regarding the same class generated simultaneously or at different timings and through keeping the other property name as another property name for the main property name after the integration.

Further, when the object sets are not considered as the same and those are in a relationship in which one of the set includes the other, such properties can be judged to be in a relationship of a higher-order property and a lower-order property and expressed with the ontology of a hierarchical structure.

Furthermore, regarding the ontology related to a specific generated class, data as instances regarding that class can be collected further by taking the property names and the object names as search keywords or by setting a search condition obtained by putting each object from the sets of each object into a rule so as to be used as new ontology creating data for expanding or correcting the ontology.

Moreover, there is described a case which adds, to the above-described exemplary embodiment, a dependent relationship judging device 304 which judges the dependent relationship between the properties and automatically adds a hierarchical structure and/or presents a proposal of adding the hierarchical structure to users.

FIG. 23 is a block diagram showing a structure of a case which adds, to the structuralizing device 3 shown in FIG. 14, the dependent relationship judging device 304 which judges the dependent relationship between the properties and automatically adds a hierarchical structure and/or presents a proposal of adding the hierarchical structure to users.

The dependent relationship judging device 304 executes an operation on the ontology to put the properties whose objects have correlativity in each instance (e.g., each record in the table of FIG. 7) into a single combination to be in a dependent relationship.

For example, FIG. 24 is an explanatory diagram showing the ontology when "customer information" class which at least has "has occupation" as one of the properties further has "has company name" property. Provided that each of the values of "has occupation" property and "has company name" property is obtained in a corresponding relationship as in FIG. 25, it can be found that there are the objects of "has company name" property only when the object of "has occupation" property is "company employee" or "public servant", and there is no object in "has company name" property when the object of "has occupation" property is "student" or there is no value.

As described above, for a plurality of properties regarding the same class, when presence of object of a given property or a specific object determines the value of the object of the other property and presence of the value, the dependent relationship judging device 304 may judge that both properties are in a dependent relationship. Regarding the properties in a dependent relationship, such dependent relationship can be expressed by creating a class showing a higher-order property thereof and putting those in a hierarchy in which the newly created class in added as an intermediate node as in shown in FIG. 26. That is, in a case of FIG. 26, the object of "has occupation" property and the object of "has company name" property as a combination of objects in a dependent relationship configure the property of "customer information" class. Furthermore, through presenting "element 1" class and "has part" (property showing that it has a given element) which are added anew in FIG. 31 to the user as a proposal, the user can correct the class name of "element 1" class to "occupation" and "has Part" property to "has occupation" to obtain more accurate ontology.

The dependent relationship judging device 304 individually functions from other devices (the necessity degree judging device 301, the complementary relationship judging device 302, the higher-and-lower relationship judging device 303) included in the structuralizing device 3 in FIG. 23, so that any of or all of those other devices may not have to be included in the structuralizing device 3. For example, the structuralizing device 3 may be configured only with the necessity degree judging device 301 and the dependent relationship judging device 304.

Third Exemplary Embodiment

A third exemplary embodiment will be described.

FIG. 28 is a block diagram showing the ontology creating device according to the third exemplary embodiment. In FIG. 28, the ontology-making device 2, the structuralizing device 3, the ontology storage device 4, the property integration device 6, and the instance acquiring device 7 are the same, respectively, as those of the second exemplary embodiment, and explanations thereof are omitted.

Referring to FIG. 28, the third exemplary embodiment does not have the data input device 1 that is provided in the first and second exemplary embodiments. Instead, the instance acquiring device 7 also functions as the first data input device 1. That is, by recording the ontology that is first created manually or existing ontology to the ontology storage device 4 or by supplying the first ontology directly to the instance acquiring device 7, instances that fit to the concept expressed by the ontology are collected to be used as the input data for creating new ontology.

The ontology creating device according to the third exemplary embodiment can be achieved by a same hardware structure as that of the ontology creating device according to the first exemplary embodiment shown in FIG. 12.

The third exemplary embodiment can achieve the same functions as those of the second exemplary embodiment with a simpler structure compared to the case of the second exemplary embodiment, since the instance acquiring device 7 also functions as the data input device 1.

Fourth Exemplary Embodiment

A fourth exemplary embodiment will be described.

FIG. 29 is a block diagram showing the ontology creating device according to the fourth exemplary embodiment. In FIG. 29, the ontology-making device 2, the structuralizing device 3, the ontology storage device 4, the property integration device 6, and the instance acquiring device 7 are the same, respectively, as those of the third exemplary embodiment, and explanations thereof are omitted.

Referring to FIG. 29, the fourth exemplary embodiment further has a data storage device 8 and an instance number evaluating device 9 in addition to the third exemplary embodiment.

The data storage device 8 stores new data acquired by the instance acquiring device.

The instance number evaluating device 9 refers to the data stored by the data storage device 8, and checks whether or not the number of kinds of properties contained in the data and the number of kinds of objects contained in the data are respective prescribed reference values or more.

When the number of any of the kinds is below the prescribed reference value, the instance number evaluating device 9 judges that sufficient judgments performed thereafter by the structuralizing device 3 or the property integration device 6 cannot be done. Thus, the processing by the structuralizing device 3 or the property integration device 6 is not executed, and the ontology created by the ontology-making device 2 is directly stored by the ontology storage device 4.

Alternatively, when the number of any of the kinds is below the prescribed reference value, the instance number evaluating device 9 requests the instance acquiring device 7 to recollect data so as to supplement the number of kinds of the properties and the number of kinds of the objects which are insufficient.

The exemplary embodiment performs structuralization and integration of the properties after checking that the collected data contains sufficient kinds of properties and sufficient kinds of objects for structuralization and integration of the properties. Therefore, collection of the ontology by structuralization and integration of the properties can be done more appropriately. At the same time, it is possible to improve efficiency of the entire ontology creating processing, since the structuralization and integration processing of the properties is not performed more than it is necessary.

The present invention has been described above by referring to the preferred embodiments. However, the present invention is not necessarily limited to those embodiments. Various kinds of modifications are possible within the scope of the technical spirit thereof.

For example, each of the devices such as the ontology-making device 2, the instance number evaluating device 9, the structuralizing device 3, and the property integration device 6 of the present invention is not necessarily limited to be connected in the order of the exemplary embodiments described above. As shown in FIG. 30, it is possible to employ a structure in which no relationship in terms of order is provided between the ontology-making device 2 and the instance number evaluating device 9 as well as between the structuralizing device 3 and the property integration device 6. Further, when the present invention is built as a program as software, it is desirable to record the program to a recording medium (program product) to be provided as a commercial transaction product.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

This Application claims the Priority right based on Japanese Patent Application No. 2007-144866 filed on May 31, 2007, and the disclosure thereof is hereby incorporated by reference in its entirety.

INDUSTRIAL APPLICABILITY

The present invention can express the concept contained in the input data in a structural manner by using a set of elements related to the structure of the concept and the properties which show the relationships between each o the elements and the concept. Therefore, it is effective for efficiently extracting the concepts contained in Web pages, files, databases and the like accumulated in servers and terminal devices within organizations or Web sites on the Internet and conducting information searches and information analyses based on the concepts. Further, the present invention is capable of expanding and correcting the structural expression of the concept with new input data, so that it is possible to quickly follow changes in the concept generated due to alterations in the contents of accumulated Web pages, files, databases, and the like. Therefore, it is possible to find changes in the concept structure and generation of new concept within organizations and on the Internet by referring to the structural expression of the concept. In addition, correction of information processing sys-

BRIEF DESCRIPTION OF THE DRAWINGS

FIG. 4 is an explanatory diagram showing an example of input data;

FIG. 6 is an explanatory diagram showing an example of ontology created by the first exemplary embodiment;

FIG. 7 is an explanatory diagram showing input data;

FIG. 15 is an explanatory diagram showing an example of input data;

FIG. 17 is an explanatory diagram showing an example of input data;

FIG. 20 is an explanatory diagram showing an example in which a plurality of input data are integrated;

FIG. 21 is an explanatory diagram showing an expressing example of ontology created by the present invention;

FIG. 25 is an illustration for describing the dependent relationship judging device 304;

REFERENCE NUMERALS

Figure 1:
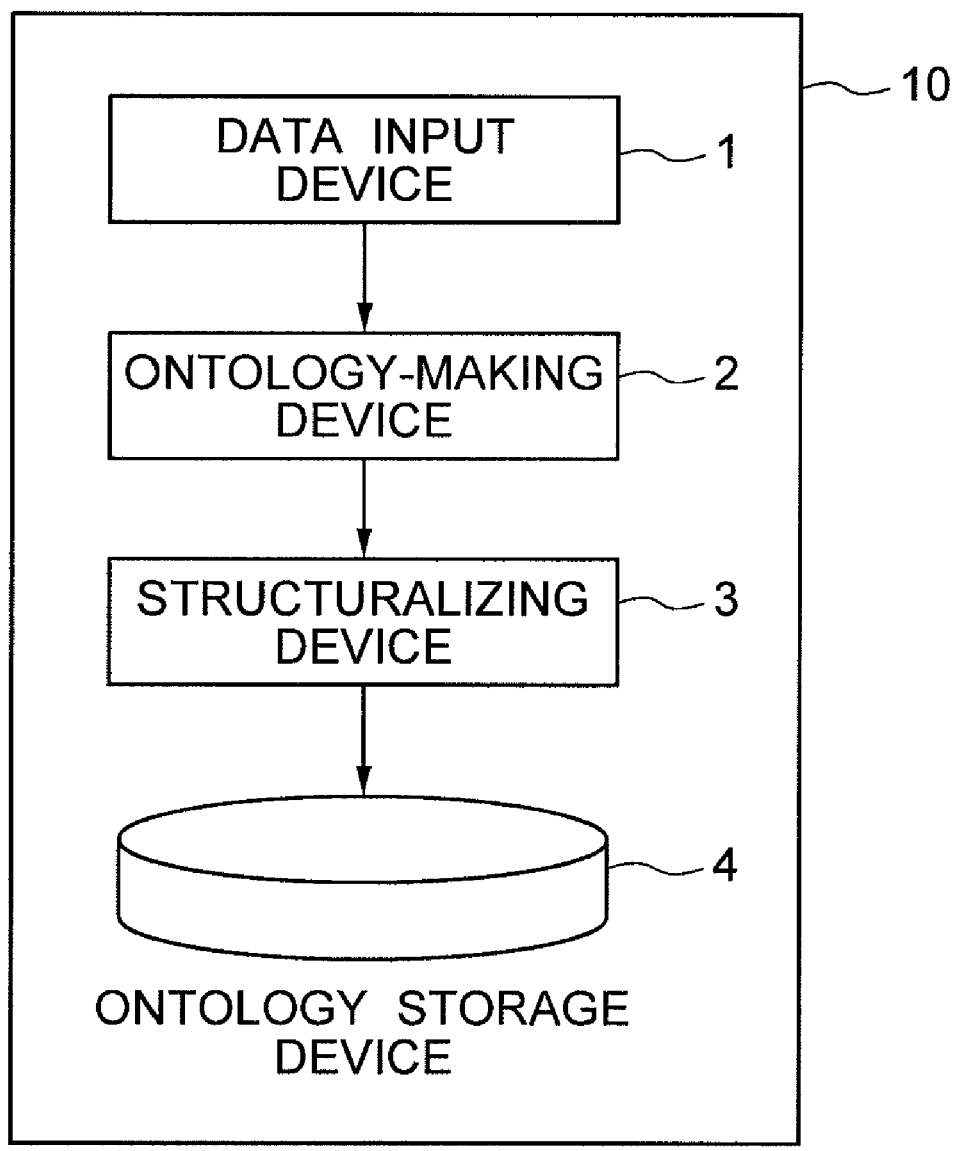
FIG. 1 is a block diagram showing a functional structure of an ontology creating device according to a first exemplary embodiment of the invention.
Figure 2:
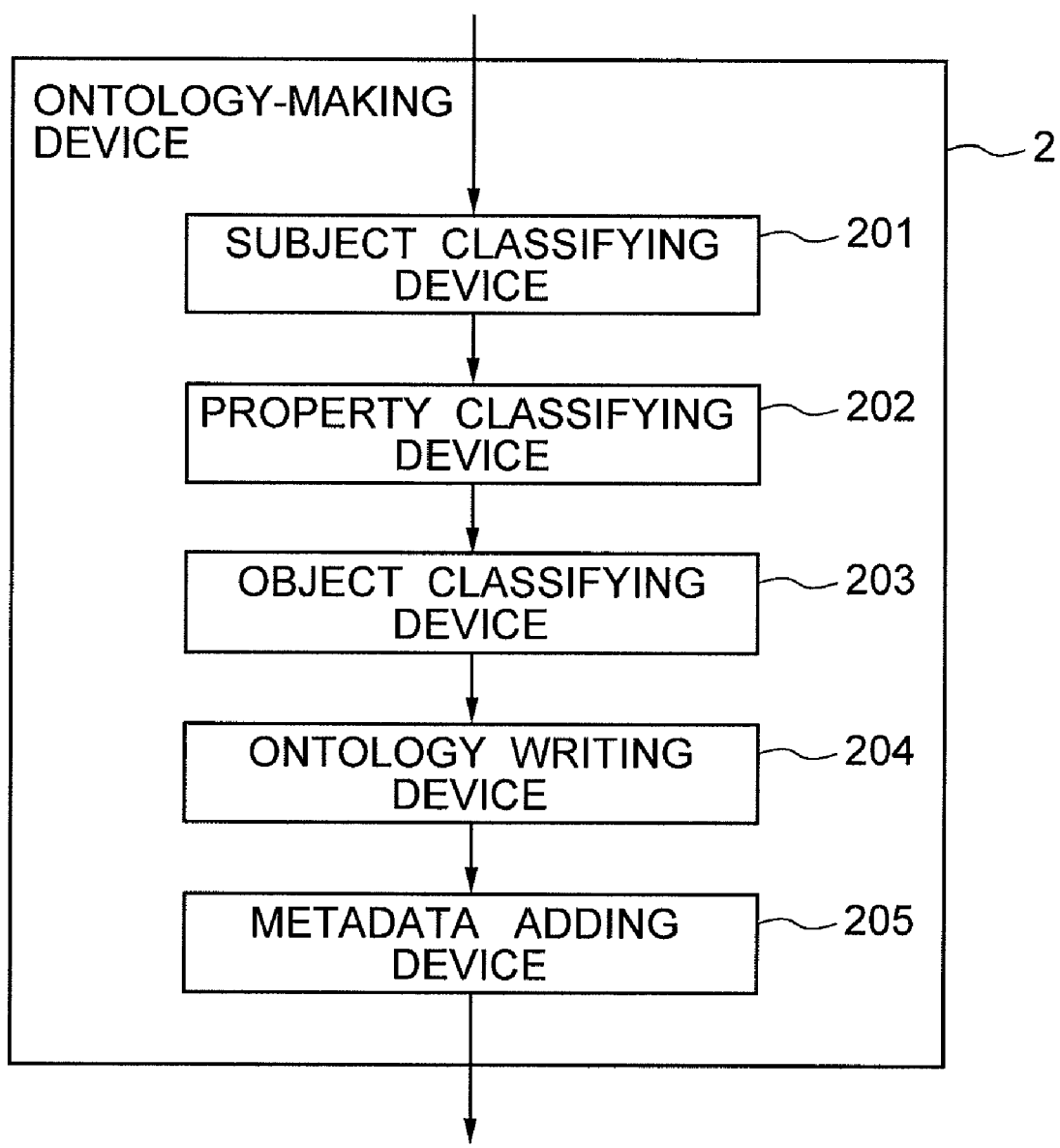
FIG. 2 is a block diagram showing an example of a functional structure of an ontology-making device according to the first exemplary embodiment.
Figure 3:
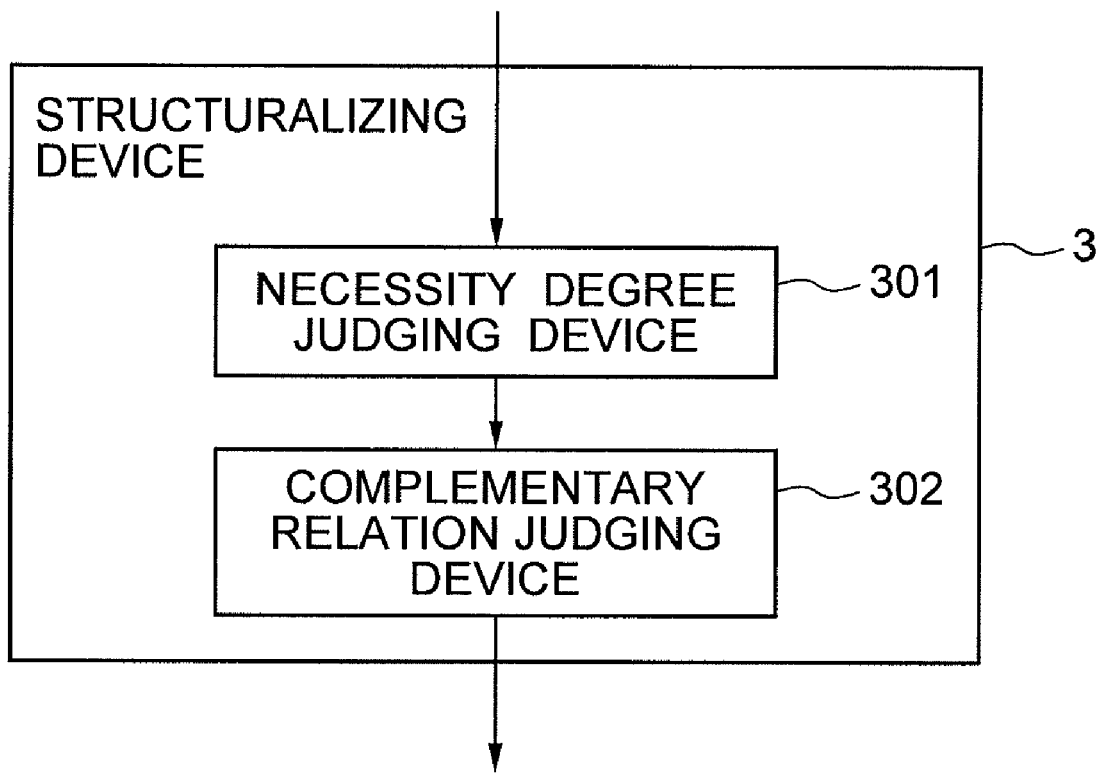
FIG. 3 is a block diagram showing an example of a functional structure of a structuralizing device according to the first exemplary embodiment.
Figure 5:
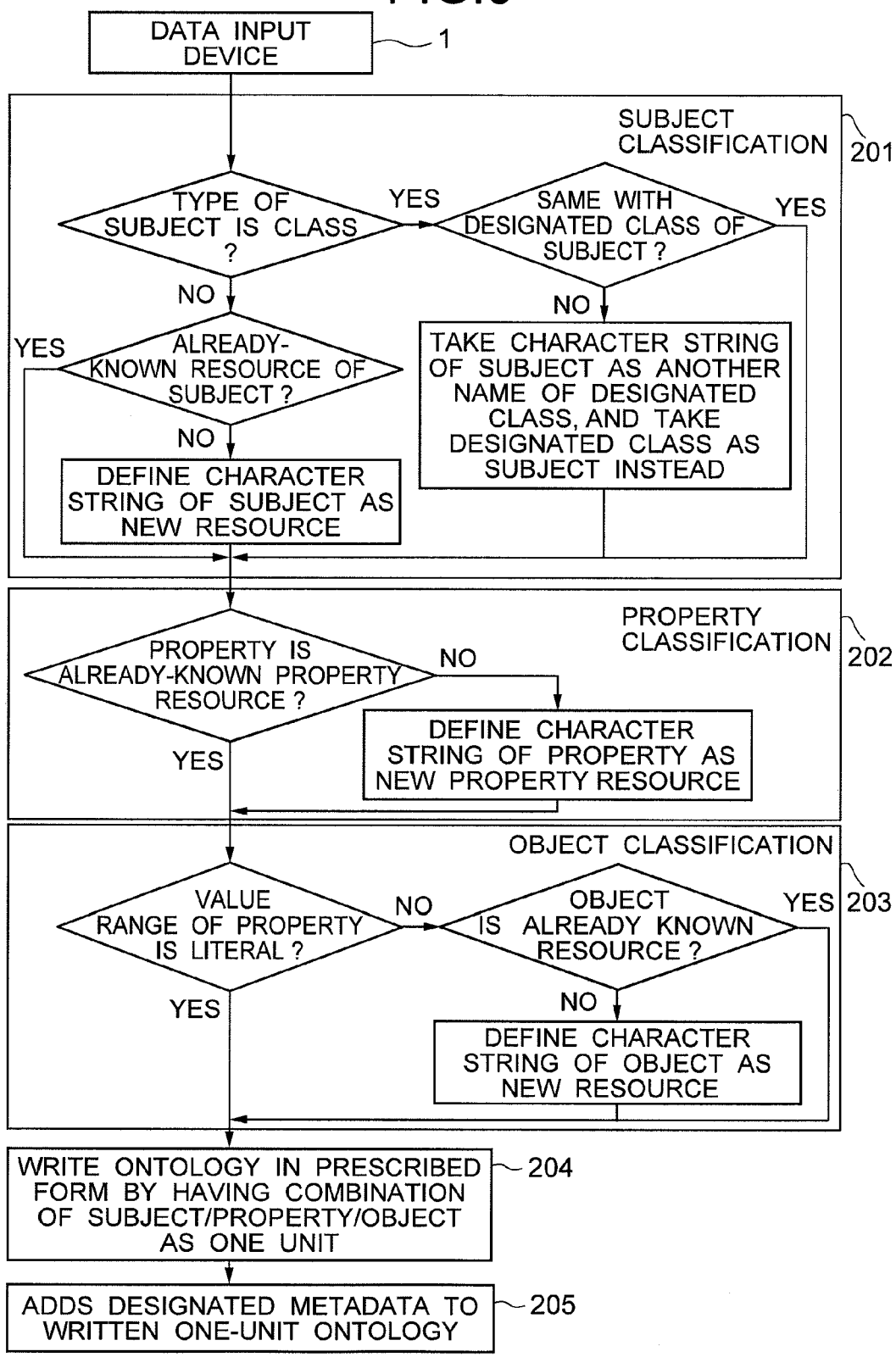
FIG. 5 is a flowchart showing actions of the ontology-making device according to the first exemplary embodiment.
Figure 8:
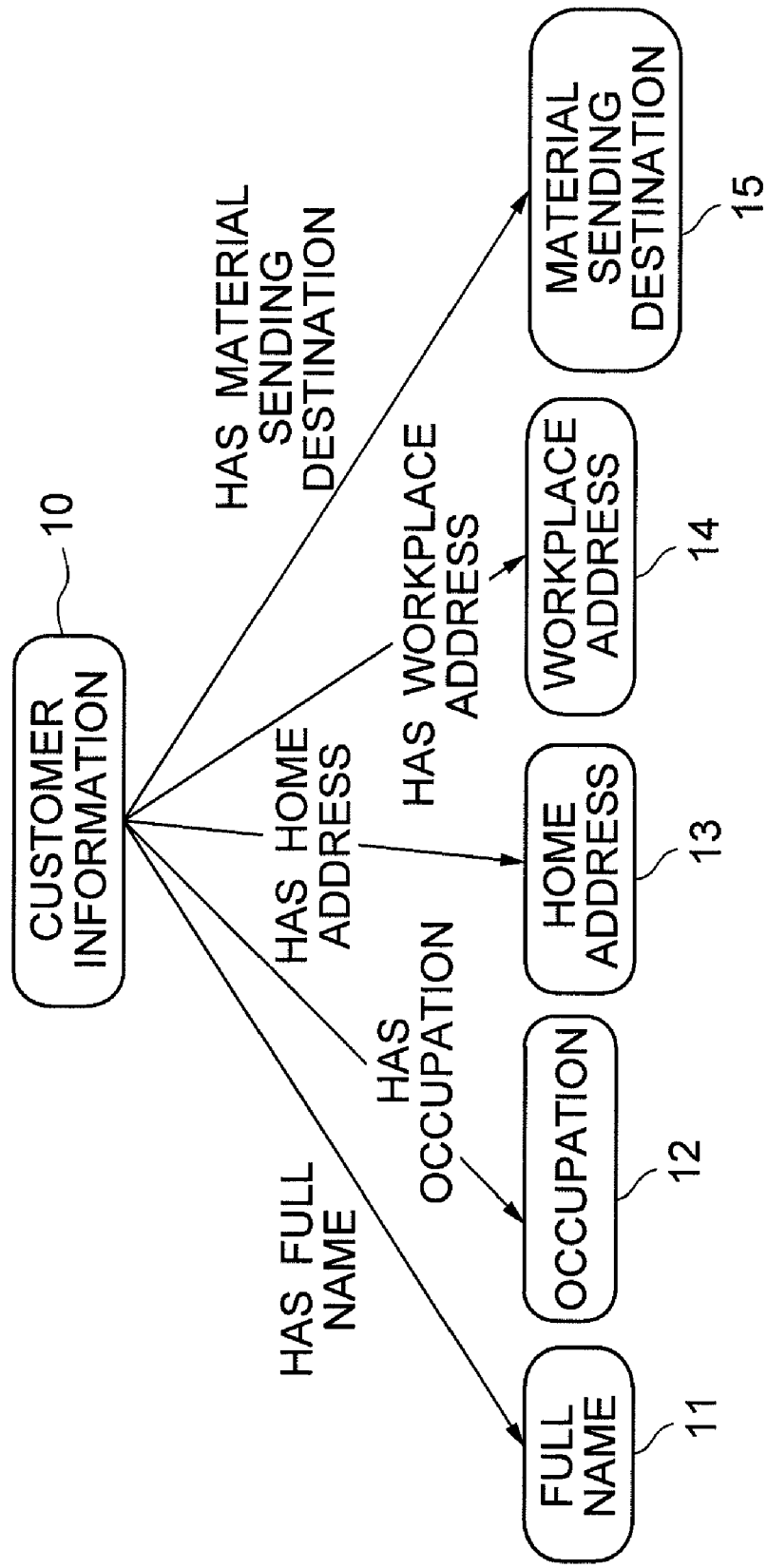
FIG. 8 is an explanatory diagram showing an expressing example of ontology created by the present invention.
Figure 9:
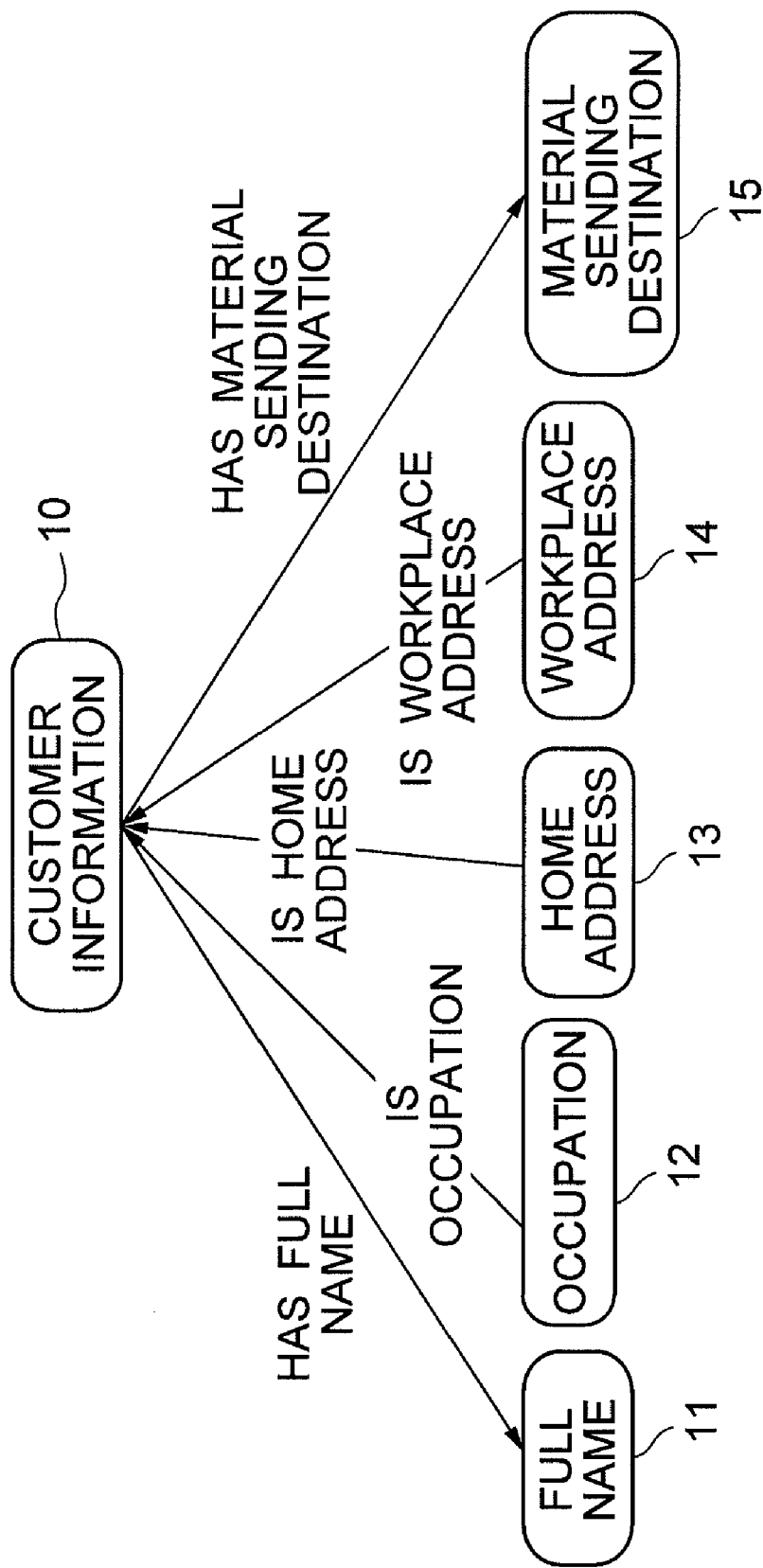
FIG. 9 is an explanatory diagram showing an expressing example of ontology created by the present invention.
Figure 10:
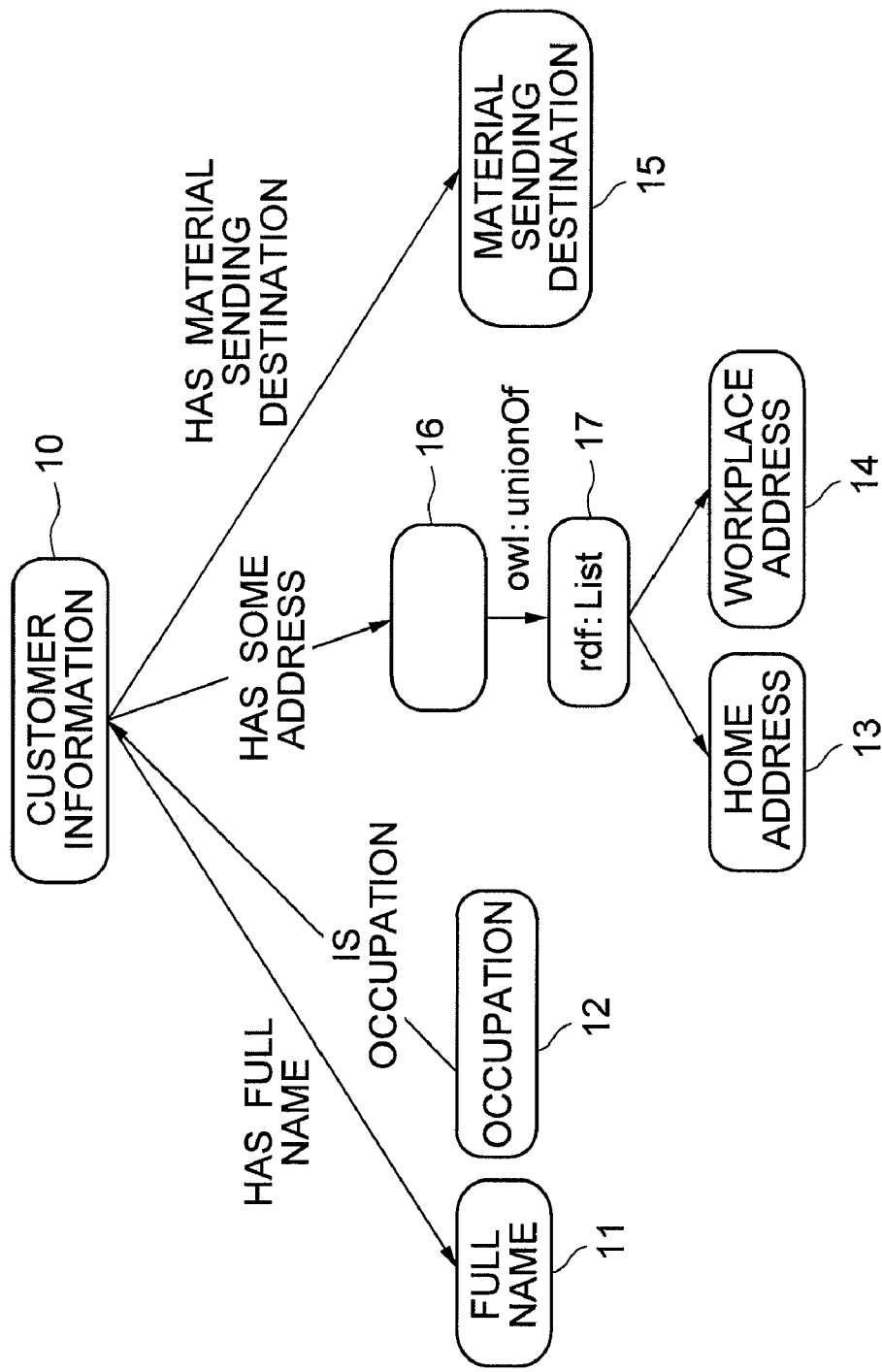
FIG. 10 is an explanatory diagram showing an expressing example of ontology created by the present invention.
Figure 11:
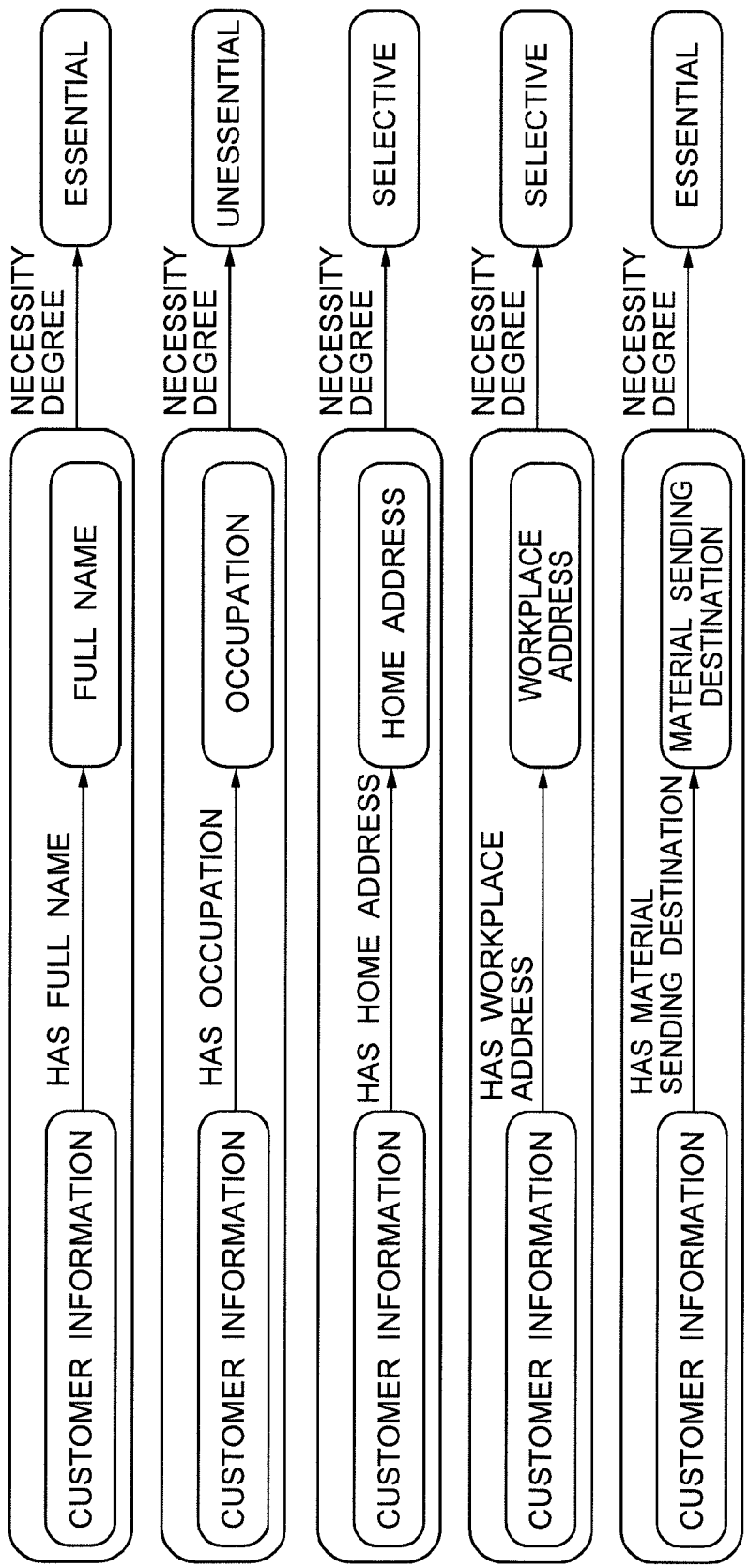
FIG. 11 is an explanatory diagram showing another expressing example of ontology created by the present invention.
Figure 12:
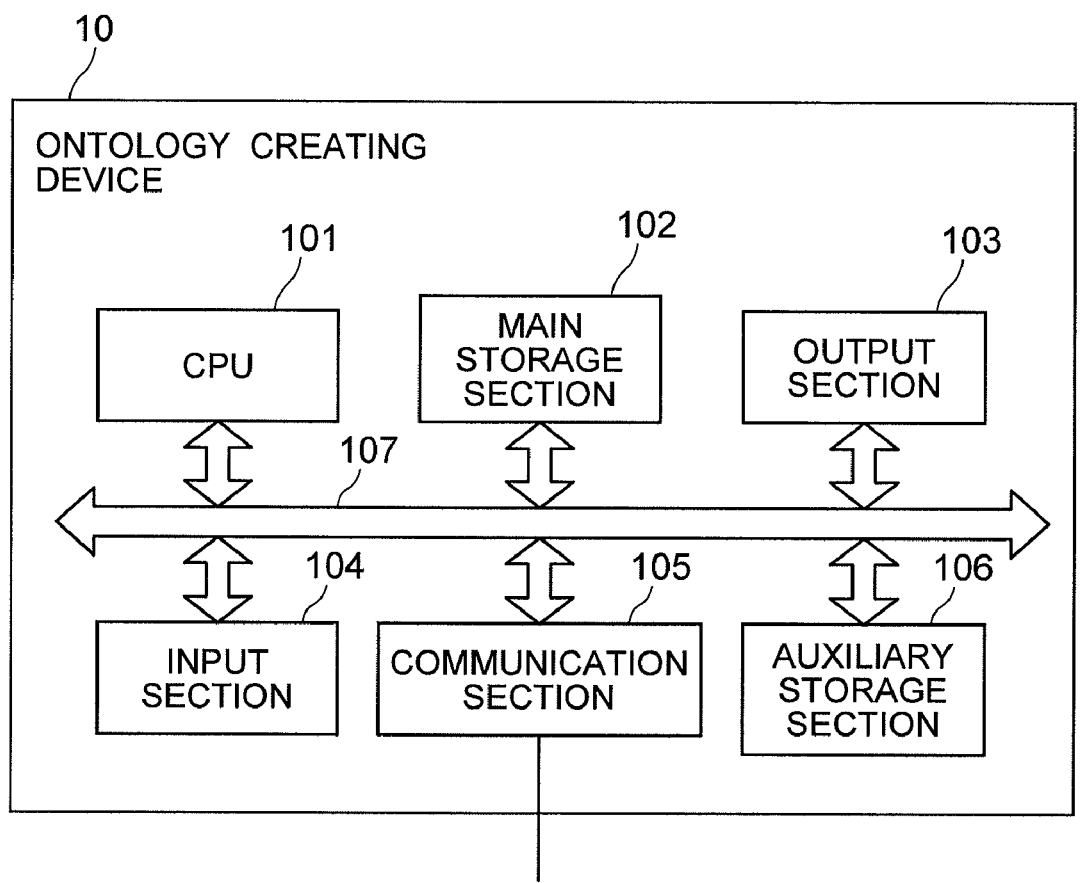
FIG. 12 is an explanatory diagram showing a hardware structure of the ontology creating device according to the first exemplary embodiment.
Figure 13:
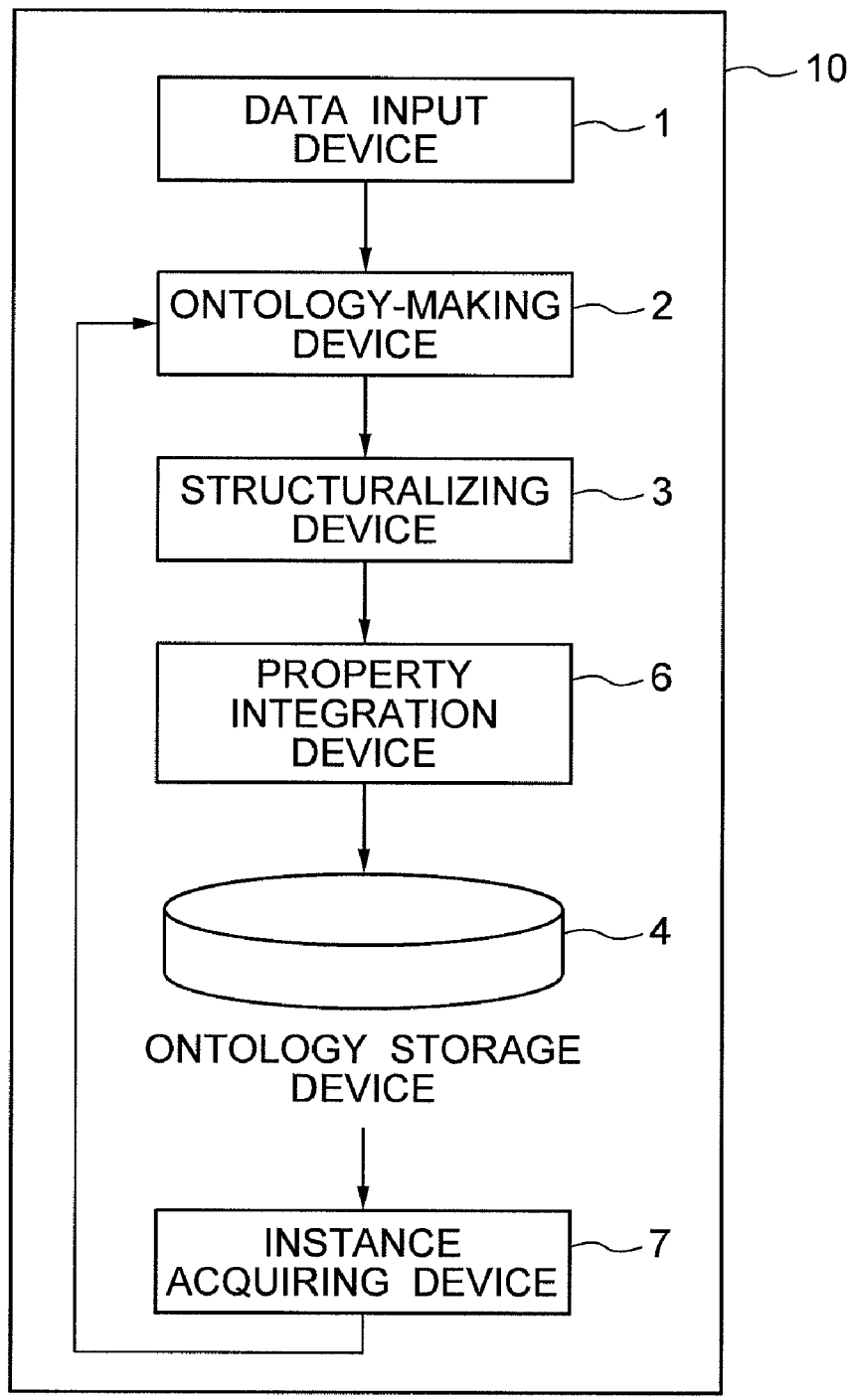
FIG. 13 is a block diagram showing a functional structure of an ontology creating device according to a second exemplary embodiment of the invention.
Figure 14:
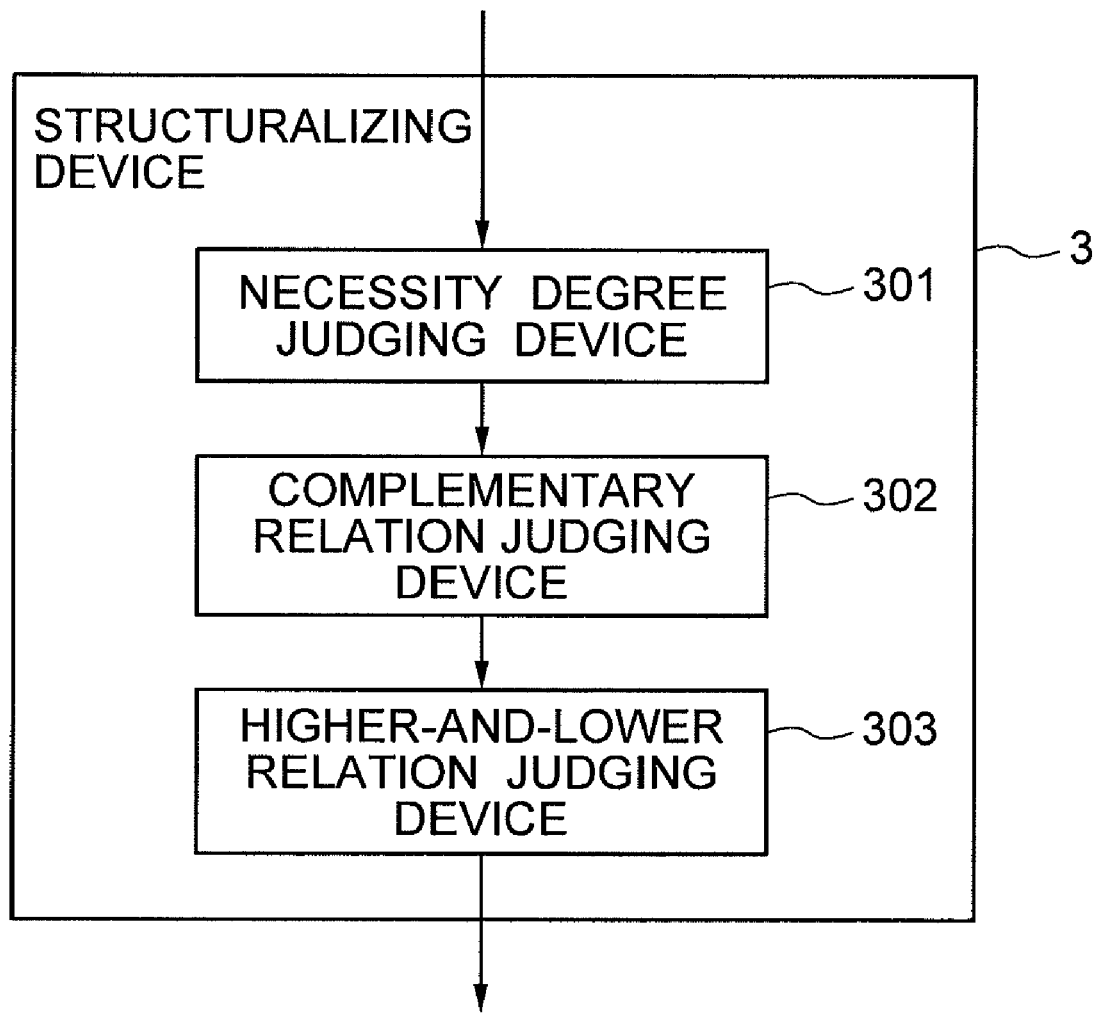
FIG. 14 is a block diagram showing an example of a functional structure of a structuralizing device according to the second exemplary embodiment.
Figure 16:
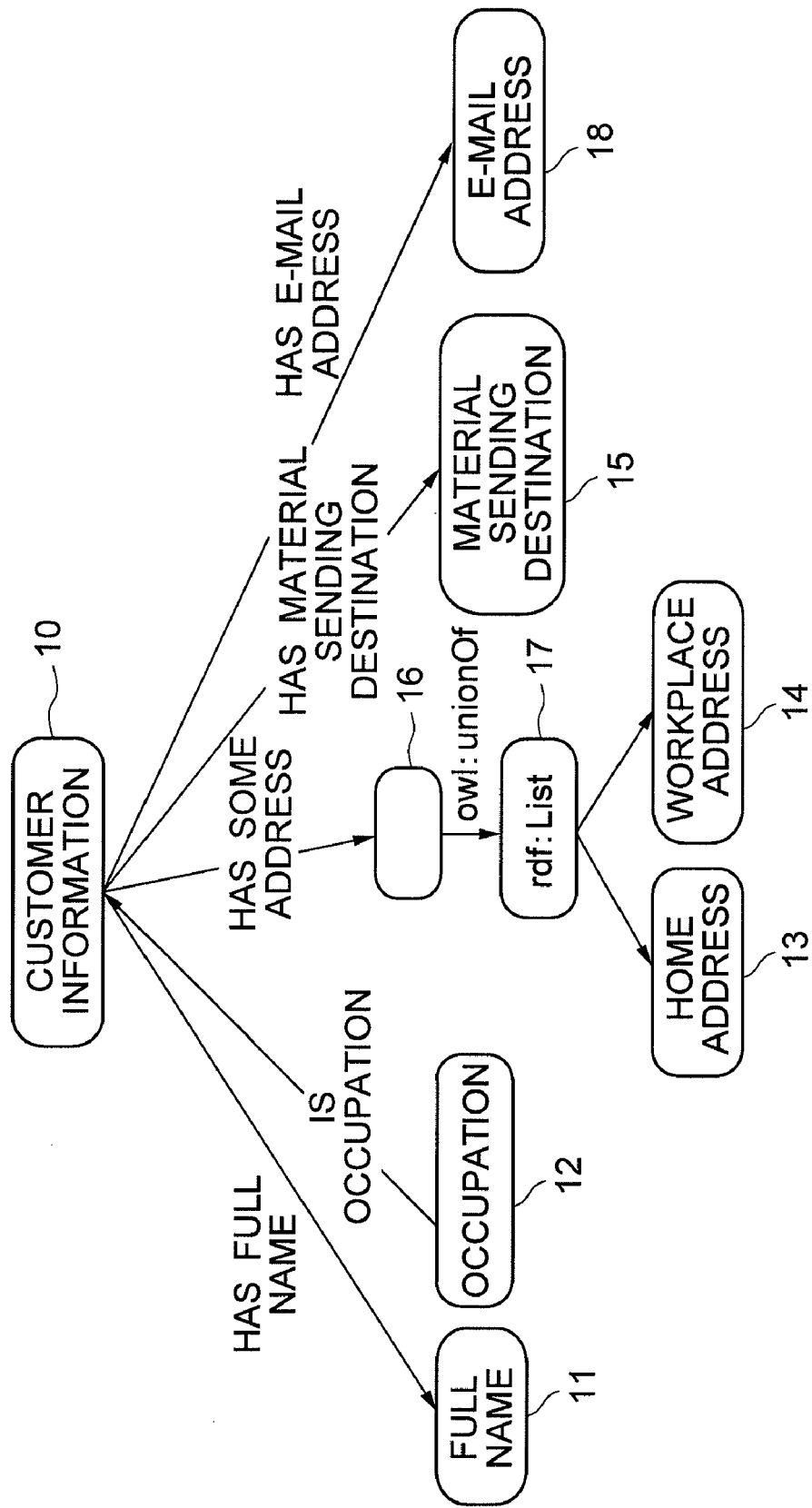
FIG. 16 is an explanatory diagram showing an expressing example of ontology created by the present invention.
Figure 18:
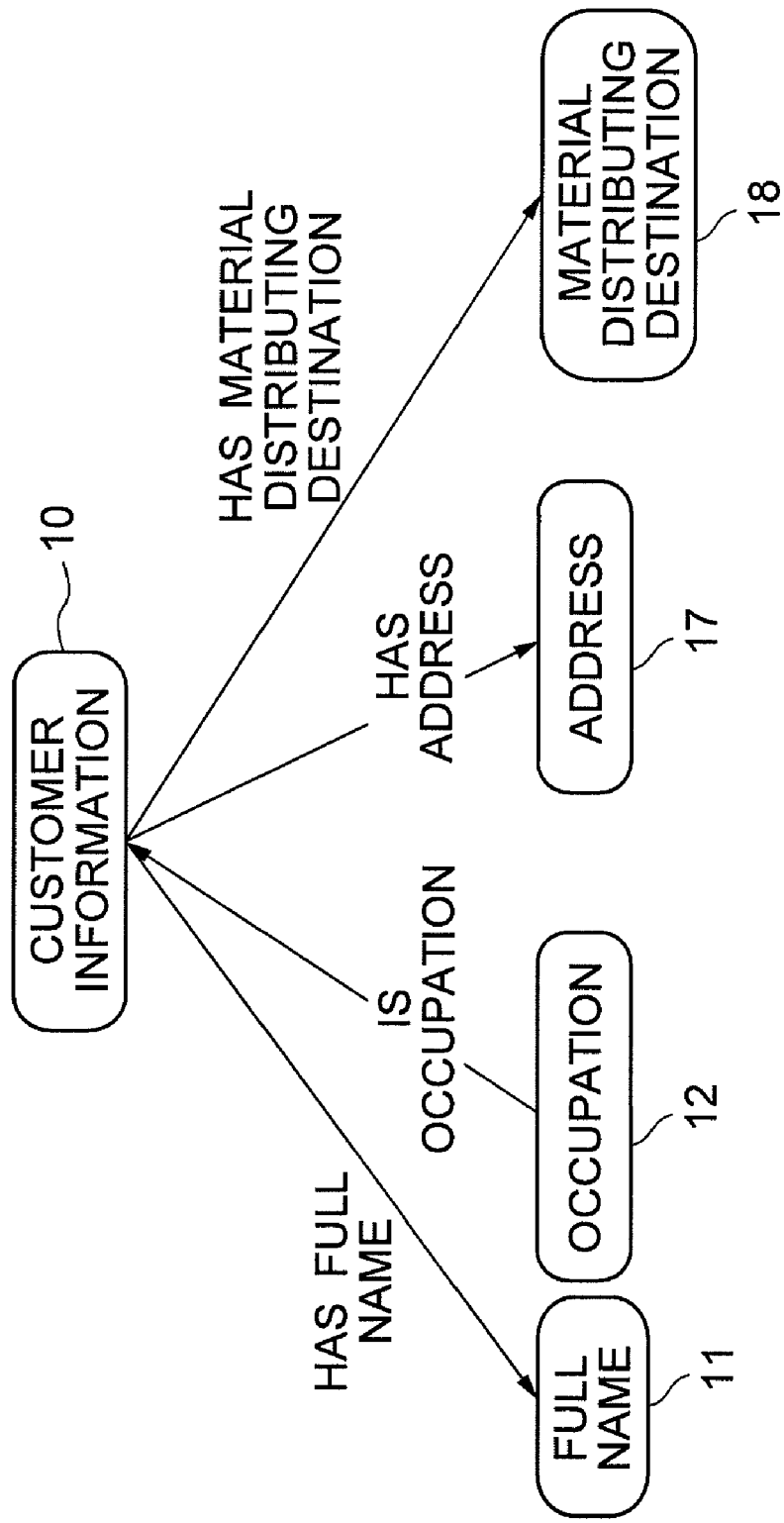
FIG. 18 is an explanatory diagram showing an expressing example of ontology created by the present invention.
Figure 19:
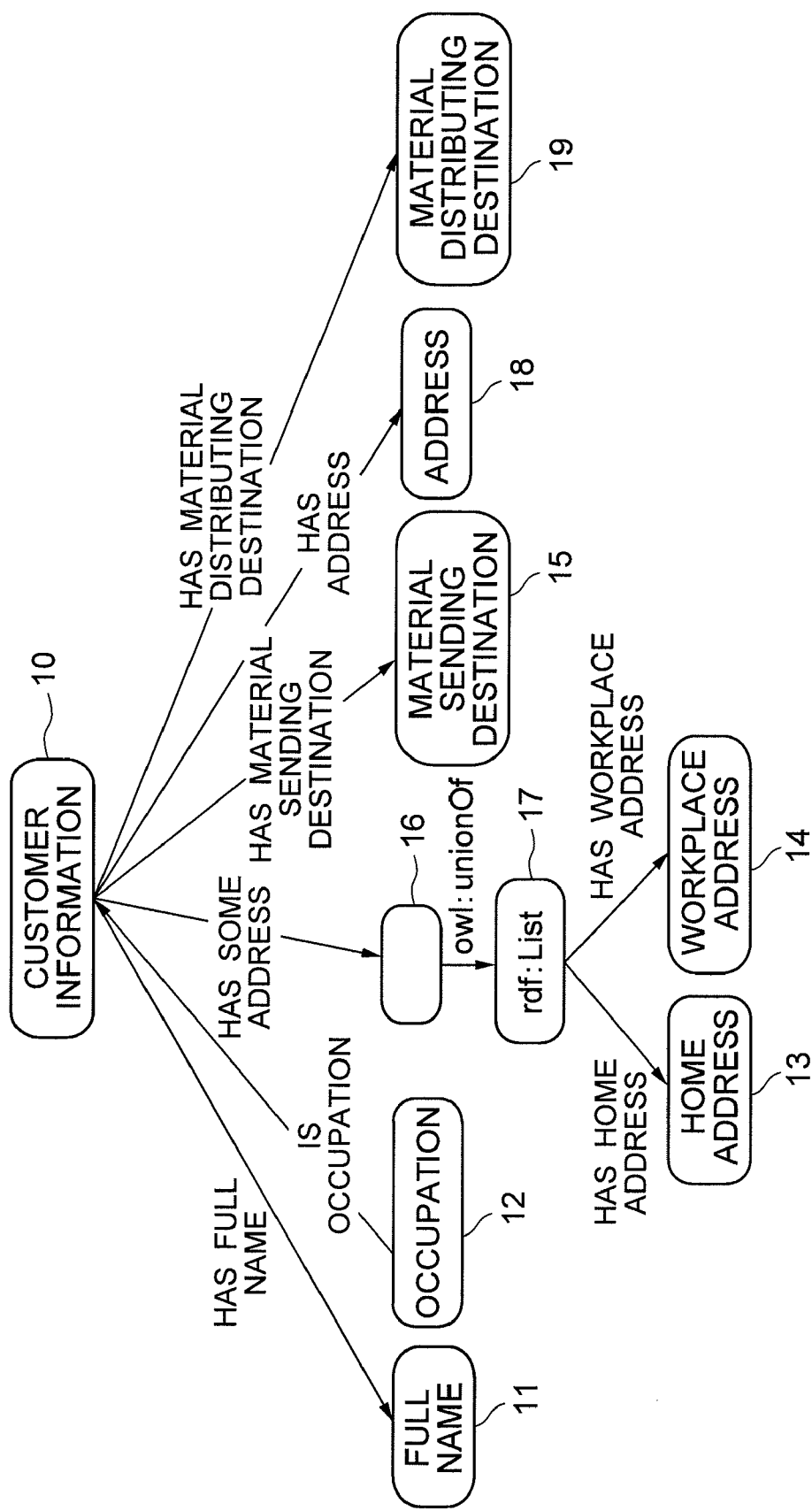
FIG. 19 is an explanatory diagram showing an expressing example of ontology created by the present invention.
Figure 22:
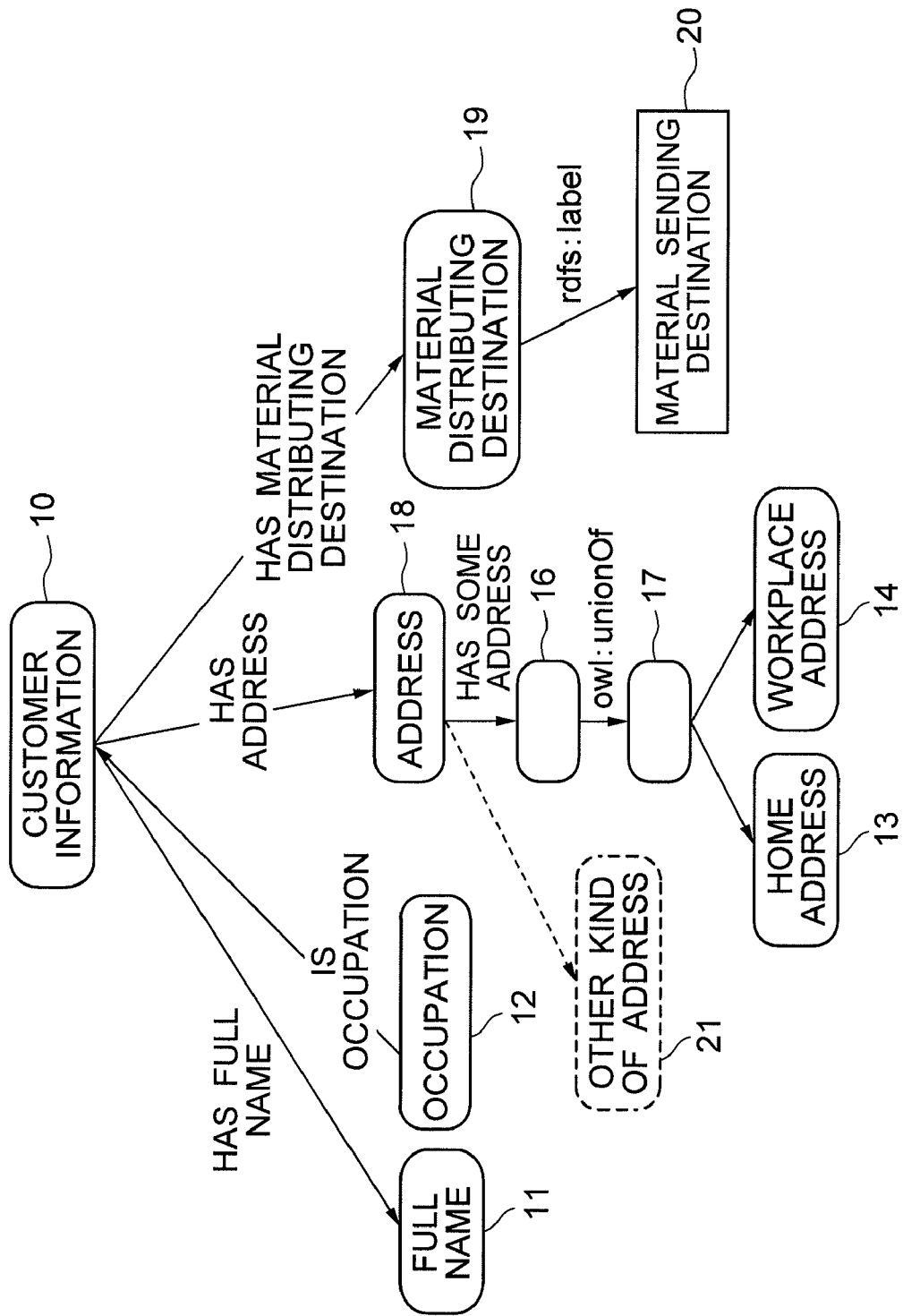
FIG. 22 is an explanatory diagram showing an expressing example of ontology created by the present invention.
Figure 23:
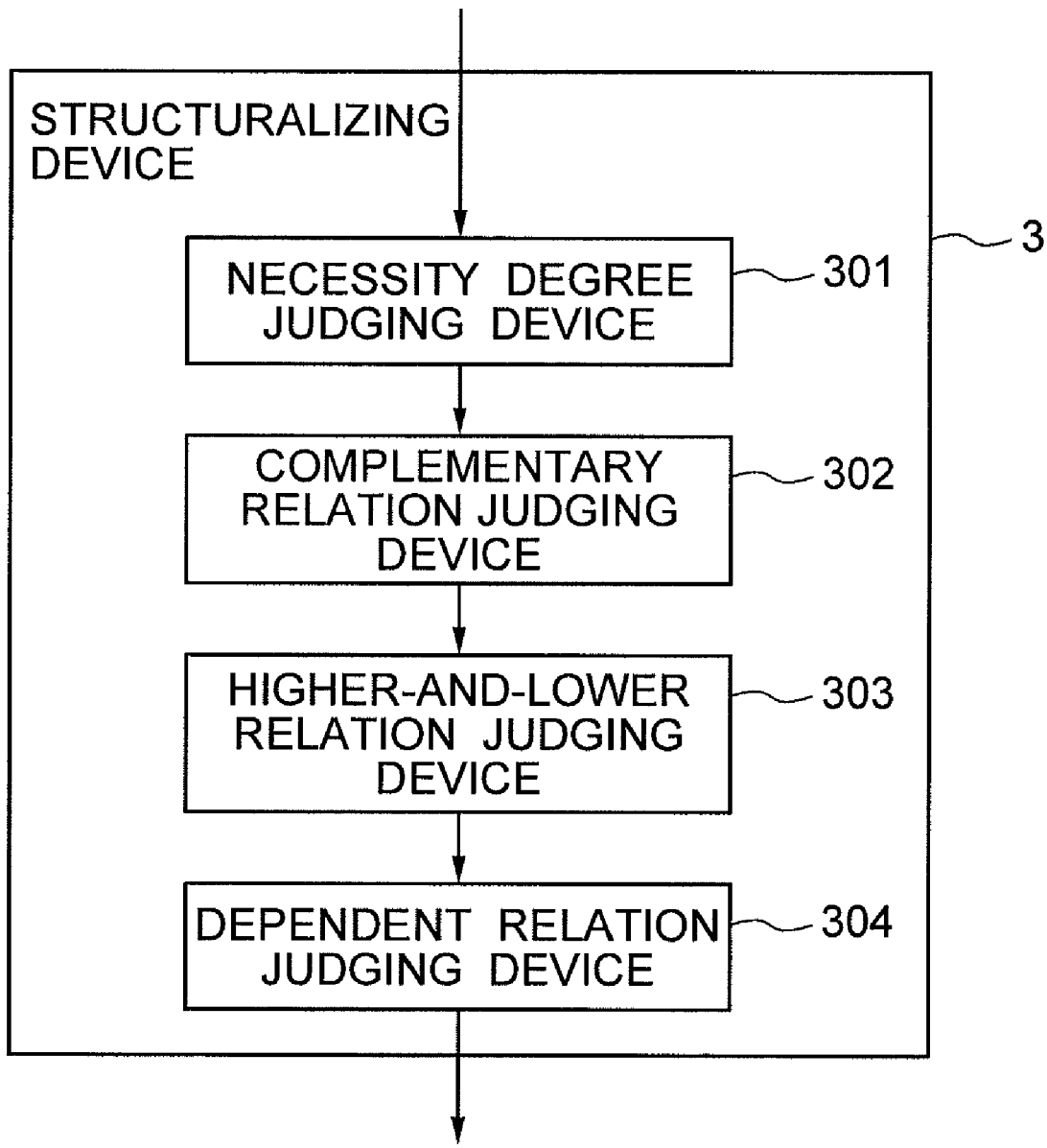
FIG. 23 is a block diagram showing a structure of a case in which a dependent relationship judging device 304 is further added to the structuralizing device shown in FIG. 14.
Figure 24:
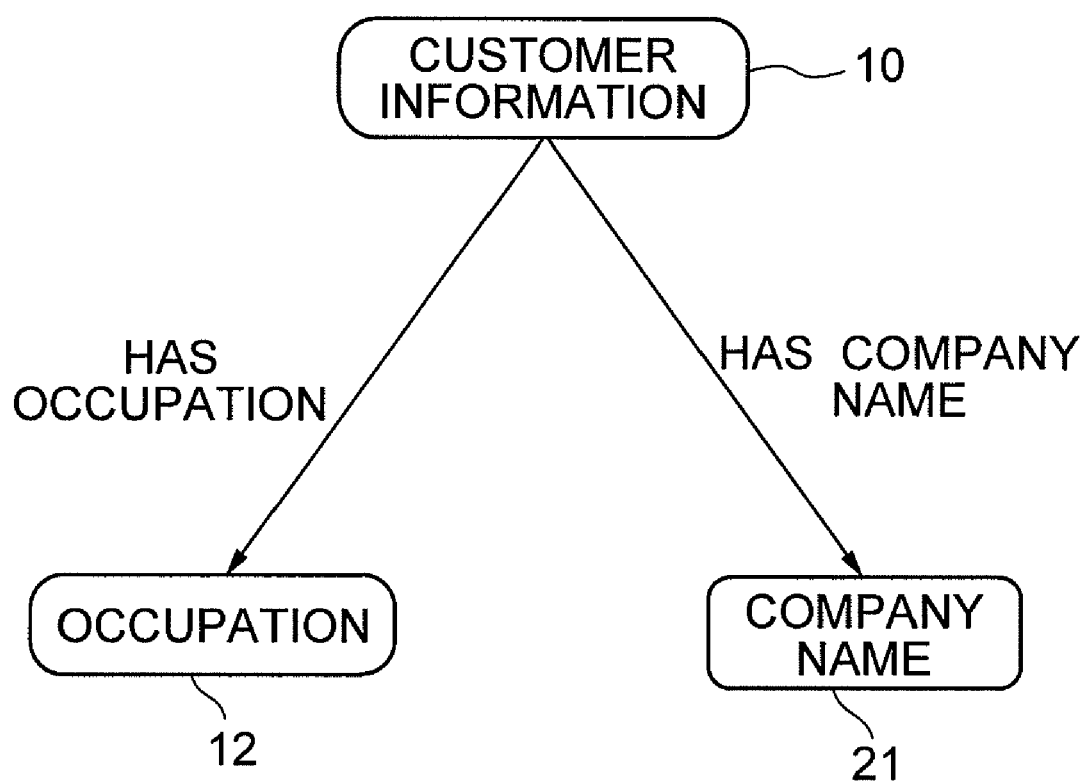
FIG. 24 is an illustration for describing the dependent relationship judging device 304.
Figure 26:
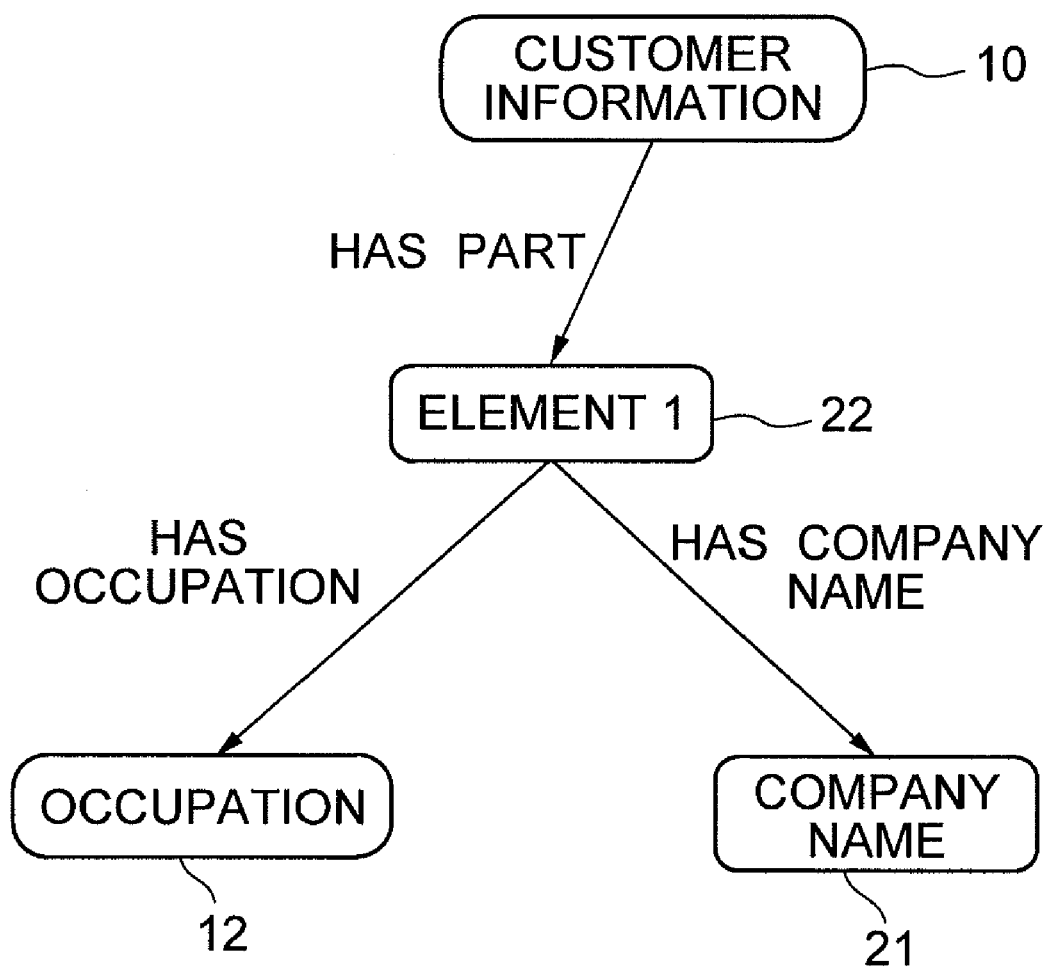
FIG. 26 is an illustration for describing the dependent relationship judging device 304.
Figure 27:
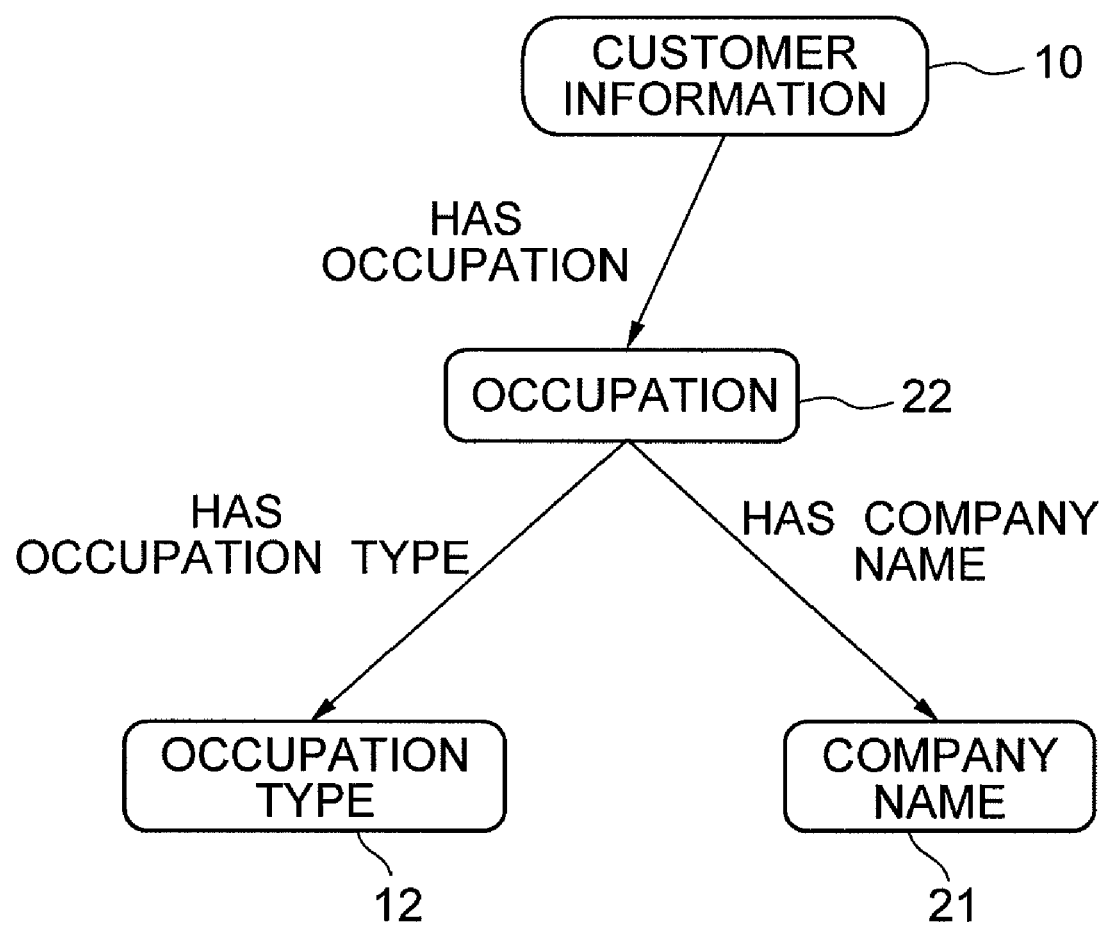
FIG. 27 is an illustration for describing the dependent relationship judging device 304.
Figure 28:
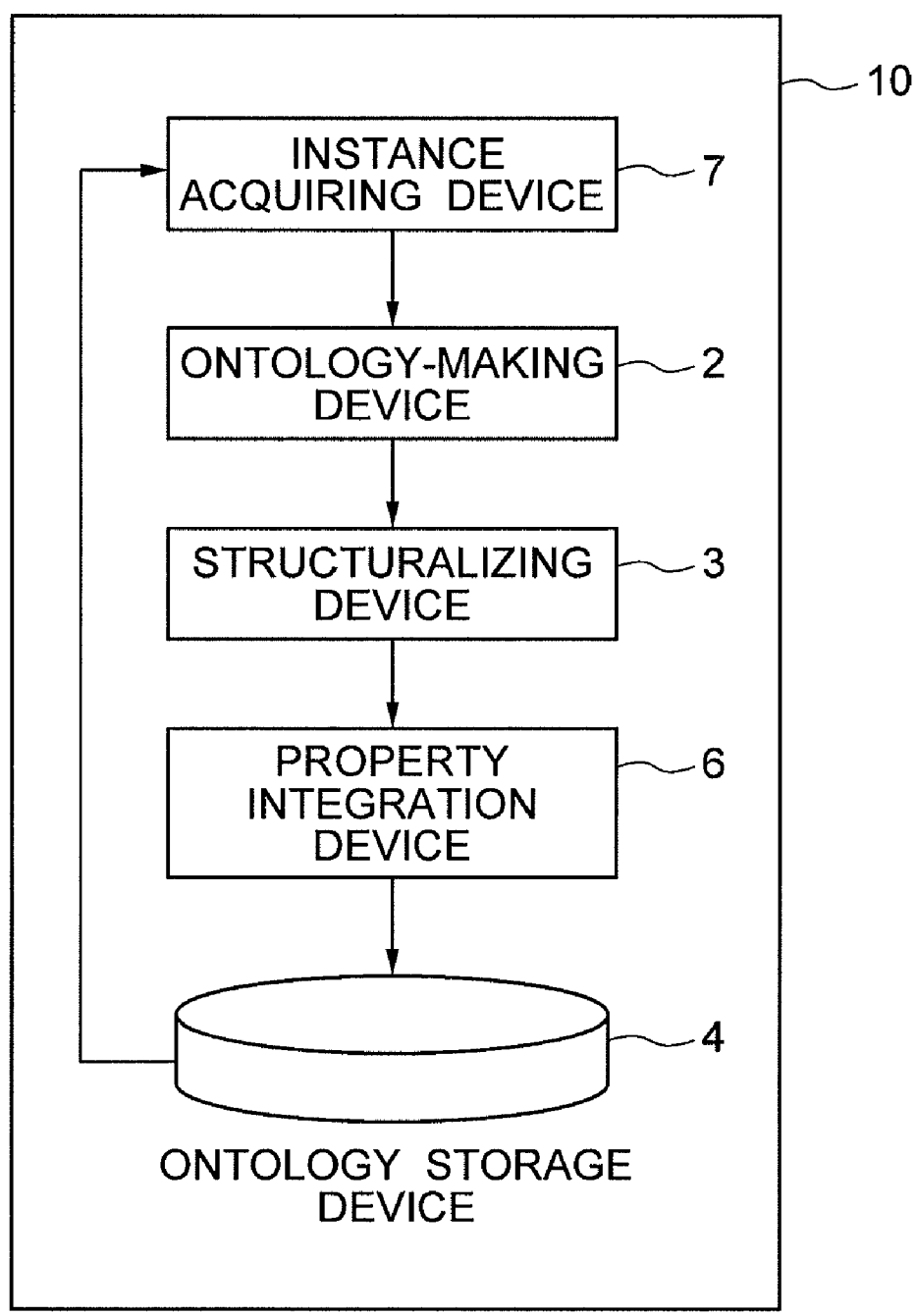
FIG. 28 is a block diagram showing a functional structure of an ontology creating device according to a third exemplary embodiment of the invention.
Figure 29:
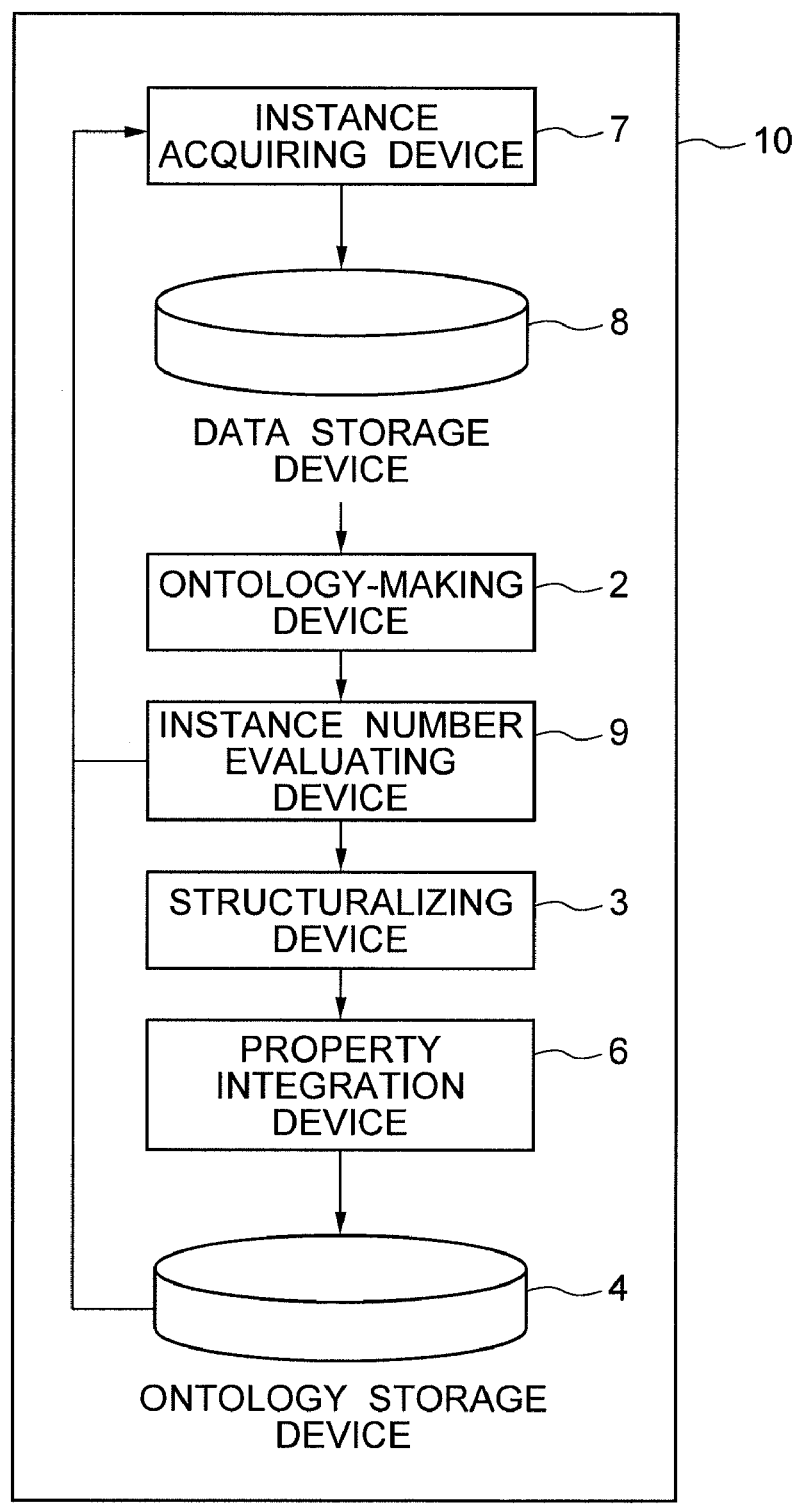
FIG. 29 is a block diagram showing a functional structure of an ontology creating device according to a fourth exemplary embodiment of the invention.
Figure 30:
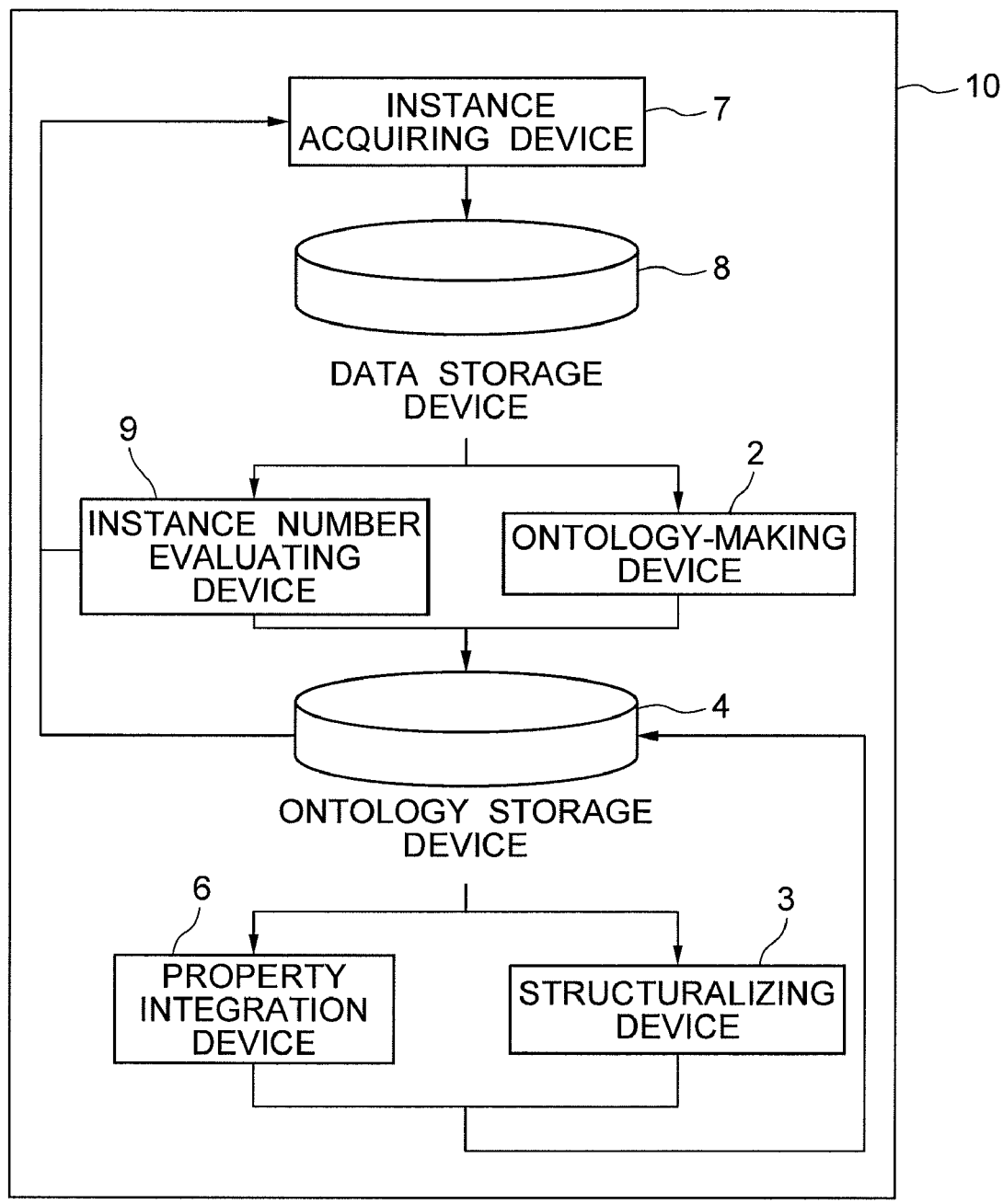
FIG. 30 is a block diagram showing another functional structure of the ontology creating device according to the fourth exemplary embodiment of the invention.
Figure 31:
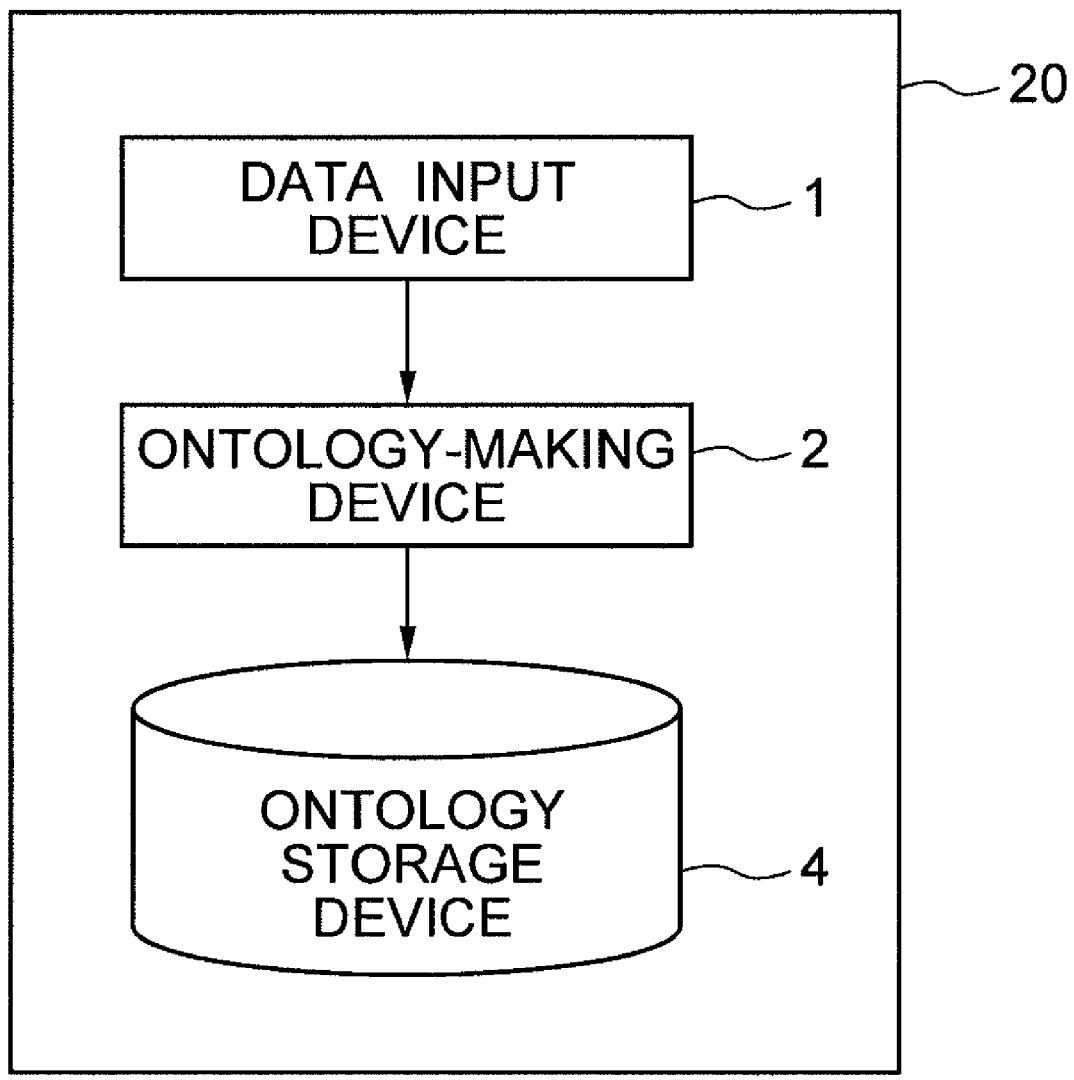
FIG. 31 is a block diagram showing a functional structure of a general-purpose type ontology creating device.
Figure 32:
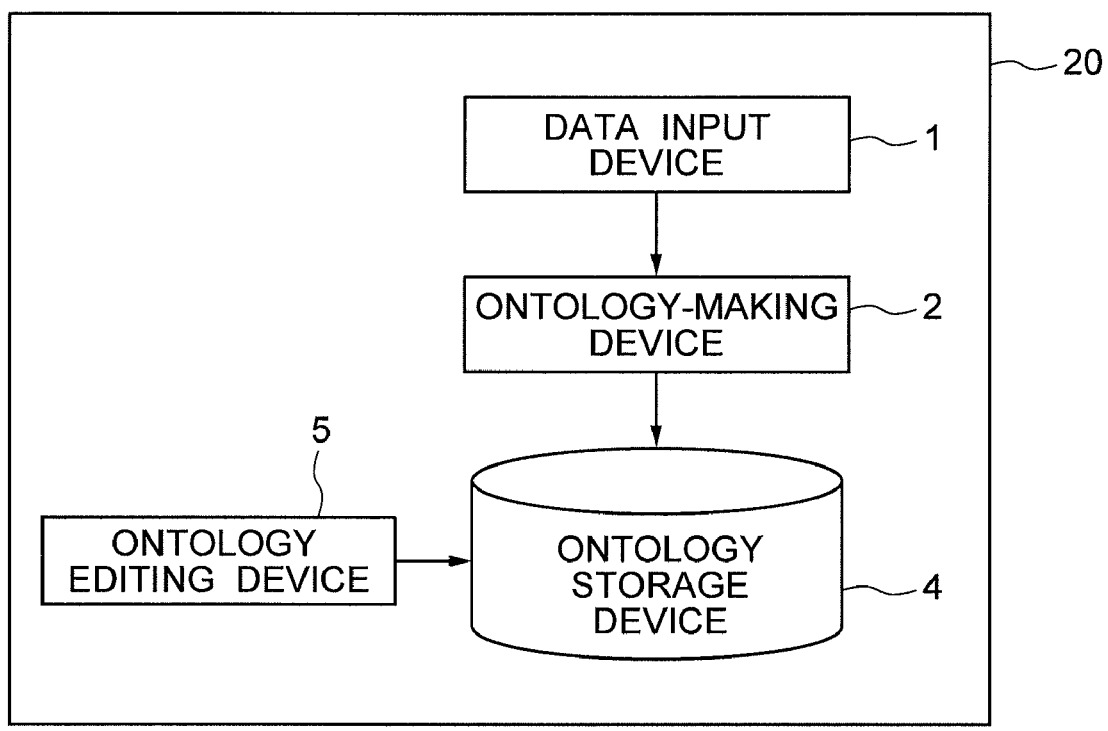
FIG. 32 is a block diagram showing another functional structure of a general-purpose type ontology creating device.

1 Data input device
2 Ontology-making device
3 Structuralizing device
4 Ontology storage device
5 Ontology editing device
6 Property integration device
7 Instance acquiring device
8 data storage device
9 Instance number evaluating device
10 Ontology creating device
101 CPU
102 Main storage section
103 Display section
104 Input section
105 Communication section
106 Auxiliary storage section
107 System bus
201 Subject classifying device
202 Property classifying device
203 Object classifying device
204 Ontology writing device
205 Metadata adding device

The invention claimed is:

1. An ontology processing device for processing an ontology, comprising:
a data input device;
a memory;
a processor; and
a computer program with instructions that, when said processor executes said instructions, is configured as a structuralizing device which corrects a structure of ontology in a prescribed form created from a set of instance data containing a combination of a subject, a property, and an object expressed with a character string;
wherein the structuralizing device comprises a necessity degree judging device which judges whether each of the properties contained in the ontology is an essential property or unessential property for a concept that is defined within the ontology and related to each of the properties according to statistical features of the objects contained in the set of the instance data, and corrects the structure of the ontology regarding the corresponding properties according to results of the judgments, and
wherein the necessity degree judging device changes the property that is judged as unessential to a property having an inverted definition range and an inverted value range.

2. The ontology processing device as claimed in claim 1, wherein the structuralizing device changes the property of the ontology according to the feature of the object.

3. The ontology processing device as claimed in claim 1, wherein the necessity degree judging device changes a name of the property judged as unessential to a property name that reflects the result of judgment.

4. The ontology processing device as claimed in claim 1, wherein the necessity degree judging device records a combination of the property that is a target of judgment and respective elements within the ontology corresponding to the definition range and the value range of the property as the result of the judgment.

5. An ontology processing device for processing ontology, comprising:
a data input device;
a memory;
processor; and
a computer program with instructions that, when said processor executes said instructions, is configured as a structuralizing device that corrects a structure of ontology in a prescribed form created from a set of instance data containing a combination of a subject, a property, and an object expressed with a character string;
wherein the structuralizing device comprises a complementary relationship judging device which detects the properties within the ontology, which are in a complementary relationship in which presence of one of the objects supplements insufficiency of other object according to statistical features of the objects contained in the set of the instance data, and replaces the properties that are in the complementary relationship with a new property that has a union of sets of the objects of the properties in the complementary relationship as a value range.

6. The ontology processing device as claimed in claim 1, wherein the structuralizing device comprises a higher-and-lower relationship judging device which detects a higher-and-lower relationship within the ontology under which one property is a higher-order property of two or more properties, and fauns a hierarchical structure of the properties in which a value range of the higher-order property is defined as a definition range of the lower-order property.

7. The ontology processing device as claimed in claim 1, comprising an ontology-making device for converting input data into ontology, wherein the ontology-making device comprises:
a subject classifying device which judges whether or not, among the input data, a part of data showing a subject shows a specific concept, and determines a converting method of the part of data showing the subject based on a result of the judgment;
a property classifying device which judges whether or not, among the input data, a part of data showing a property is an already-known property, and determines a converting method of the part of data showing the property based on a result of the judgment;
an object classifying device which judges whether a part of data among the input data, which shows an object, is a literal or a resource, and determines a converting method of the part of data showing the object based on a result of the judgment; and
an ontology writing device which writes ontology in a prescribed form by using the result obtained by converting the data showing the subject, the property, and the object with the determined converting methods.

8. The ontology processing device as claimed in claim 1, wherein the ontology-making device comprises a metadata adding device which extracts metadata contained in the input data, and adds the metadata to the ontology written by the ontology writing device.

9. The ontology processing device as claimed in claim 1, comprising a property integration device which judges, regarding any of two properties contained in the ontology, whether or not sets of objects that are value ranges thereof are common to each other, and integrates the properties and the objects of the properties that are considered in common.

10. The ontology processing device as claimed in claim 9, wherein, when values of the metadata corresponding to each of any of the two properties contained in the ontology are both below a prescribed reference value or when similarity between the values of the metadata is below a prescribed reference value, the property integration device dismisses integration of the two properties and the objects of the properties.

11. The ontology processing device as claimed in claim 1, comprising an instance acquiring device which additionally acquires data which satisfies a target and restriction of a concept that is expressed by the ontology.

12. The ontology processing device as claimed in claim 1, comprising an instance number evaluating device which judges whether or not one of or both of number of kinds of data that is a part showing the property of the ontology and number of kinds of data that is a part showing the object equals to or more than a prescribed reference value and, when one of or both of the values is equal to or more than the prescribed reference value, gives an instruction to perform structuralization of the properties by the structuralizing device or integration of the properties by the property integration device.

13. The ontology processing device as claimed in claim 1, comprising a dependent relationship judging device which judges a dependent relationship between the properties and adds a hierarchical structure, or presents a proposal of adding a hierarchical structure.

14. A non-transitory computer readable recording medium storing an ontology processing program which, when loaded into a memory and run by a computer, causes the computer to execute functions including:
correcting a structure of ontology in a prescribed form created from a set of instance data containing a combination of a subject, a property, and an object expressed with a character string;
judging whether each of the properties contained in the ontology is an essential property or an unessential property for a concept that is defined within the ontology and related to each of the properties according to statistical features of the objects contained in the set of instance data;
correcting the structure of the ontology regarding the corresponding properties according to results of the judgments; and
changing a property that is judged as unessential to a property having an inverted definition range and an inverted value range.

15. The non-transitory computer readable recording medium storing the ontology processing program as claimed in claim 14, which enables the computer to execute a function of changing the property of the ontology according to the feature of the object.

16. The non-transitory computer readable recording medium storing the ontology processing program as claimed in claim 14, which enables the computer to execute a function of detecting a higher-and-lower relationship within the ontology under which one property is a higher-order property of two or more properties, and forming a hierarchical structure of the properties in which a value range of the higher-order property is defined as a definition range of the lower-order property.

17. The non-transitory computer readable recording medium storing the ontology processing program as claimed in claim 14, which enables the computer to execute:
  a function of judging whether or not, among the input data, a part of data showing a subject shows a specific concept, and determining a converting method of the part of data showing the subject based on a result of the judgment;
  a function of judging whether or not, among the input data, a part of data showing a property is an already-known property, and determining a converting method of the part of data showing the property based on a result of the judgment;
  a function of judging whether a part of data among the input data, which shows an object, is a literal or a resource, and determining a converting method of the part of data showing the object based on a result of the judgment; and
  a function of writing ontology in a prescribed form by using the result obtained by converting the data showing the subject, the property, and the object with the determined converting methods.

18. The non-transitory computer readable recording medium storing the ontology processing program as claimed in claim 17, which enables the computer to execute a function of extracting metadata contained in the input data, and adding the metadata to the written ontology.

19. The non-transitory computer readable recording medium storing the ontology processing program as claimed in claim 17, which enables the computer to execute a function of judging, regarding any of two properties contained in the ontology, whether or not sets of objects that are value ranges thereof are common to each other, and integrating the properties and the objects of the properties that are considered in common.

20. The non-transitory computer readable recording medium storing the ontology processing program as claimed in claim 17, which enables the computer to execute a function of additionally acquiring data which satisfies a target and restriction of a concept that is expressed by the ontology.

21. The non-transitory computer readable recording medium storing the ontology processing program as claimed in claim 14, which enables the computer to execute a function of judging whether or not one of or both of number of kinds of data that is a part showing the property of the ontology and number of kinds of data that is a part showing the object equals to or more than a prescribed reference value and, when one of or both of the values is equal to or more than the prescribed reference value, and of giving an instruction to perform structuralization of the properties by the structuralizing device or integration of the properties by the property integration device.

22. The non-transitory computer readable recording medium storing the ontology processing program as claimed in claim 14, which enables the computer to execute a function of judging a dependent relationship between the properties and adding a hierarchical structure, or presenting a proposal of adding a hierarchical structure.

23. A computerized method for processing ontology, comprising:
  a processor correcting a structure of ontology created from a set of instance data containing a combination of a subject, a property, and an object expressed with a character string according to statistical features of the objects contained in the set of the instance data;
  the processor judging whether each of the properties contained in the ontology is an essential property or an unessential property for a concept that is defined within the ontology and related to each of the properties according to statistical features of the objects contained in the set of instance data;
  the processor correcting the structure of the ontology regarding the corresponding properties according to results of the judgments; and
  the processor changing a property that is judged as unessential to a property having an inverted definition range and an inverted value range.

24. The computerized method as claimed in claim 23, wherein the structure of the ontology is corrected by changing the property of the ontology according to the feature of the object.

25. The computerized method as claimed in claim 23, wherein, in the structuralization, the structure of the ontology is corrected by changing a name of the property judged as unessential to a property name that shows a result of the judgment.

26. The computerized method as claimed in claim 23, comprising:
  the processor recording a combination of the property that is a target of judgment and respective elements within the ontology corresponding to the definition range and the value range of the property as the result of the judgment.

27. The computerized method as claimed in claim 23, comprising:
  the processor detecting the properties within the ontology, which are in a complementary relationship in which presence of one of the objects supplements insufficiency of other object; and
  the processor replacing the properties that are in the complementary relationship with a new property that has a union of sets of the objects of the properties in the complementary relationship as a value range.

28. The computerized method as claimed in claim 23, comprising:
  the processor detecting a higher-and-lower relationship within the ontology under which one property is a higher-order property of two or more properties; and
  the processor forming a hierarchical structure of the properties in which a value range of the higher-order property is defined as a definition range of the lower-order property.

29. The ontology processing computerized method as claimed in claim 27, comprising:
  the processor inputting instance data containing a combination of a subject, a property, and an object expressed with a character string; and
  the processor converting the input data to ontology of a prescribed form.

30. The computerized method as claimed in claim 29, comprising:
  the processor judging whether or not, among the input data, a part of data showing a subject shows a specific concept, and determining a converting method of the part of data showing the subject based on a result of the judgment;
  the processor judging whether or not, among the input data, a part of data showing a property is an already-known property, and determining a converting method of the part of data showing the property based on a result of the judgment;

the processor whether a part of data among the input data, which shows an object, is a literal or a resource, and determining a converting method of the part of data showing the object based on a result of the judgment; and the processor writing ontology in a prescribed form by using the result obtained by converting the data showing the subject, the property, and the object with the determined converting methods.

31. The computerized method as claimed in claim 29, comprising:

the processor extracting metadata contained in the input data; and the processor adding the metadata to the written ontology.

32. The computerized method as claimed in claim 31, wherein, as the metadata, metadata containing a value of reliability of the data is used.

33. The computerized method as claimed in claim 31, wherein, as the metadata, metadata containing a data collection source place is used.

34. The computerized method as claimed in claim 23, comprising:

the processor regarding any of two properties contained in the ontology, judging whether or not sets of objects that are value ranges thereof are common to each other; and the processor integrating the properties and the objects of the properties that are considered in common.

35. The computerized method as claimed in claim 34, wherein, at the time of performing integration of the properties, when values of the metadata corresponding to each of any of the two properties contained in the ontology are both below a prescribed reference value or when similarity between the values of the metadata is below a prescribed reference value, the integration of the two properties and the objects of the properties is dismissed.

36. The computerized method as claimed in claim 23, comprising:

the processor additionally acquiring data which satisfies a target and restriction of a concept that is expressed by the ontology; and the processor converting the acquired data into ontology.

37. The ontology processing method as claimed in claim 23, comprising:

among the input data or data which satisfies a target and restriction of a concept expressed by the ontology, the processor judging whether or not one of or both of number of kinds of data that is a part showing the property and number of kinds of data that is a part showing the object equals to or more than a prescribed reference value; and when one of or both of the values is equal to or more than the prescribed reference value, the processor performing structuralization of the properties or integration of the properties.

38. The computerized method as claimed in claim 23, comprising:

the processor judging a dependent relationship between the properties and adding a hierarchical structure, or presenting a proposal of adding a hierarchical structure.

* * * * *